(12) United States Patent
Kim et al.

(10) Patent No.: US 12,124,130 B2
(45) Date of Patent: Oct. 22, 2024

(54) DISPLAY DEVICE AND METHOD FOR MANUFACTURING SAME

(71) Applicant: SAMSUNG ELECTRONICS CO., LTD., Suwon-si (KR)

(72) Inventors: Daesik Kim, Suwon-si (KR); Kyonghyong Kim, Suwon-si (KR); Yasuhiro Nishida, Suwon-si (KR); Jongil Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/388,058

(22) Filed: Nov. 8, 2023

(65) Prior Publication Data

US 2024/0069382 A1 Feb. 29, 2024

Related U.S. Application Data

(63) Continuation of application No. PCT/KR2022/009660, filed on Jul. 5, 2022.

(30) Foreign Application Priority Data

Jul. 21, 2021 (KR) .................. 10-2021-0095936

(51) Int. Cl.
*G02F 1/00* (2006.01)
*G02F 1/1335* (2006.01)
*G02F 1/13357* (2006.01)

(52) U.S. Cl.
CPC .. *G02F 1/133607* (2021.01); *G02F 1/133603* (2013.01); *G02F 1/133611* (2013.01); *G02F 1/133605* (2013.01)

(58) Field of Classification Search
None
See application file for complete search history.

(56) References Cited

U.S. PATENT DOCUMENTS 9,574,737 B2 2/2017 Park et al.
10,553,763 B2 2/2020 Yamada et al.
(Continued)

FOREIGN PATENT DOCUMENTS

JP 4366154 B2 11/2009
JP 2018-18711 A 2/2018
(Continued)

OTHER PUBLICATIONS

International Search Report (PCT/ISA/210) issued by the International Searching Authority on Oct. 20, 2022 in corresponding International Application No. PCT/KR2022/009660.

*Primary Examiner* — Gerald J Sufleta, II
(74) *Attorney, Agent, or Firm* — Sughrue Mion, PLLC

(57) ABSTRACT

A display device includes a backlight unit including: a substrate; a Light Emitting Diode (LED) disposed on a surface of the substrate; and a refractive cover configured to surround the LED. The refractive cover includes: a first refractive surface to: be spaced apart from the LED by a preset distance, be positioned on the upper surface of the substrate, be parallel to an axis of the LED or be inclined within one angle from the axis of the LED; a second refractive surface to be a curved surface in which an angle between a tangent line and the axis of the LED increases from a region connected to another upper portion of the first refractive surface toward a direction of the axis of the LED; and a third refractive surface to be connected to an portion of the second refractive surface and be perpendicular to the axis of the LED.

16 Claims, 24 Drawing Sheets

(56) References Cited

U.S. PATENT DOCUMENTS

| | | |
|---|---|---|
| 11,171,261 B2 | 11/2021 | Yamada et al. |
| 2010/0002465 A1 | 1/2010 | Tsang et al. |
| 2011/0057205 A1 | 3/2011 | Mueller et al. |
| 2013/0234184 A1 | 9/2013 | Chen et al. |
| 2015/0109762 A1* | 4/2015 | Lee ................... F21V 13/04 362/329 |
| 2016/0146430 A1* | 5/2016 | Yeh ................ G02B 19/0028 362/296.05 |
| 2018/0323346 A1* | 11/2018 | Lee ..................... H01L 33/325 |
| 2022/0206337 A1 | 6/2022 | Kim et al. |
| 2023/0213174 A1 | 7/2023 | Lee |

FOREIGN PATENT DOCUMENTS

| | | |
|---|---|---|
| JP | 2018-67441 A | 4/2018 |
| JP | 6365592 B2 | 8/2018 |
| JP | 10-2019-0021689 A | 3/2019 |
| KR | 10-0691181 B1 | 3/2007 |
| KR | 10-0712880 B1 | 5/2007 |
| KR | 10-2009-0127296 A | 12/2009 |
| KR | 10-1144635 B1 | 5/2012 |
| KR | 10-2012-0057726 A | 6/2012 |
| KR | 10-2019-0090332 A | 8/2019 |
| KR | 10-2019-0143243 A | 12/2019 |
| KR | 10-2021-0037979 A | 4/2021 |

\* cited by examiner

| BEAM ANGLE (LED EMISSION) | REFRACTIVE SURFACE | CHANGE IN EMISSION ANGLE UPON INCREASE IN BEAM ANGLE |
|---|---|---|
| 0 ~ θa | THIRD REFRACTIVE SURFACE(183) | INCREASE |
| θa ~ θb | SECOND REFRACTIVE SURFACE(182) | DECREASE TO NON-REFRACTIVE POINT(182P) |
| | | INCREASE TO NON-REFRACTIVE POINT(182P) |
| θb ~ 90 | FIRST REFRACTIVE SURFACE(181) | DECREASE |

(a)

(b)

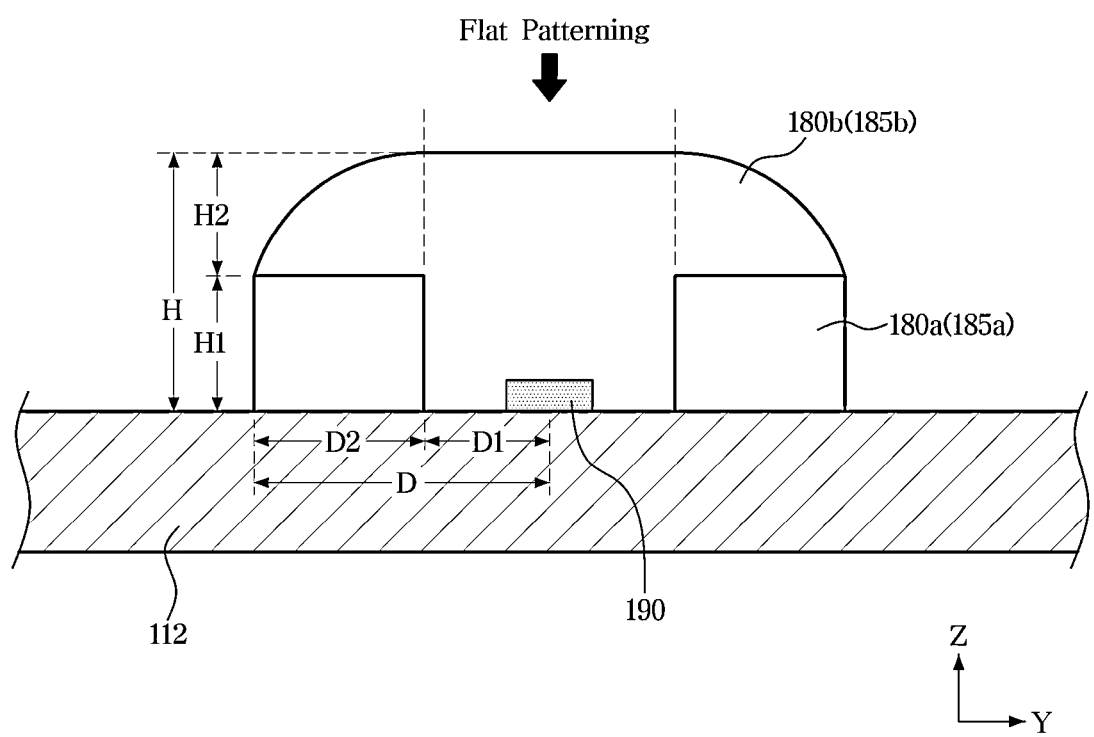

DISPLAY DEVICE AND METHOD FOR MANUFACTURING SAME

CROSS-REFERENCE TO RELATED APPLICATIONS

This application is a by-pass continuation application of International Application No. PCT/KR2022/009660, filed on Jul. 5, 2022, which is based on and claims priority to Korean Patent Application No. 10-2021-0095936, filed on Jul. 21, 2021, in the Korean Intellectual Property Office, the disclosures of which are incorporated by reference herein their entireties.

BACKGROUND

1. Field

The disclosure relates to a display device including a backlight unit (BLU) and a liquid crystal panel.

2. Description of Related Art

In general, display devices are output devices for visually displaying obtained or stored image information to a user, and are used in various fields such as at home or in workplaces.

For example, the display devices include a monitor device connected to a personal computer or a server computer, a portable computer device, a navigation terminal device, a general television device, Internet Protocol Television (IPTV), portable terminal devices such as a smartphone, tablet Personal Computer (PC), a Personal Digital Assistant (PDA) or a cellular phone, various display devices used to reproduce images such as advertisements or movies in an industrial field, or various kinds of audio/video systems.

A display device includes a backlight unit (BLU) providing light to a liquid crystal panel. The backlight unit includes a plurality of point light sources capable of independently emitting light. The light sources include, for example, a Light Emitting Diode (LED), or an Organic LED (OLED).

Display devices have become thinner. As a result, an Optical Distance (OD) for converting a point light source to a surface light source has decreased. Even as the optical distance is reduced, a luminance and luminance uniformity of a display device is required to be maintained.

Displays have a problem known as 'Mura effect,' which is also known as 'clouding'. Mura effect manifests itself as a change in luminance and/or color level in different points of the panel. Mura effect is caused by the non-homogeneous backlight illumination of the panel, and is more visible in full color patterns (i.e. full white, full blue etc. . . . ). Various kinds of defects in display components can cause the Mura effect.

SUMMARY

Provided are a display device that may implement an ultra-slim backlight unit providing uniform back light without Mura effect by using a Distributed Bragg Reflector (DBR) Light Emitting Diode (LED) that has light distribution of high beam angle and using a refractive cover capable of increasing light extraction efficiency through a simple dispensing process.

According to an aspect of the disclosure, a display device includes: a liquid crystal panel; and a backlight unit configured to provide light to the liquid crystal panel, wherein the backlight unit includes: a substrate; a Light Emitting Diode (LED) disposed on an upper surface of the substrate; and a refractive cover configured to surround the LED, wherein the refractive cover includes: a first refractive surface configured to: be spaced apart from the LED by a preset distance, be positioned on the upper surface of the substrate, be parallel to a central axis of the LED or be inclined within a first angle from the central axis of the LED; a second refractive surface configured to be a curved surface in which a second angle between a tangent line and the central axis of the LED increases from a region connected to an upper portion of the first refractive surface toward a direction of the central axis of the LED; and a third refractive surface configured to be connected to an upper portion of the second refractive surface and be perpendicular to the central axis of the LED.

In an embodiment, the LED includes: a light emitting layer; and a Distributed Bragg Reflector (DBR) configured to be disposed on the light emitting layer, and wherein an intensity of light emitted from the LED is maximum in a direction inclined at the second angle from the central axis of the LED.

In an embodiment, the second refractive surface includes a first region through which light with a maximum light intensity, among the light emitted from the LED, passes.

In an embodiment, the first refractive surface includes a second region through which light with a half of the maximum light intensity, among the light emitted from the LED, passes, the light being inclined at an angle greater than the second angle from the central axis of the LED.

In an embodiment, the third refractive surface includes a third region through which light with a half of the maximum light intensity, among the light emitted from the LED, passes, the light being inclined at an angle smaller than the second angle from the central axis of the LED.

In an embodiment, the third refractive surface is configured to be a plane.

In an embodiment, the third refractive surface is configured to have a concave shape.

In an embodiment, the third refractive surface is configured to have a convex shape.

In an embodiment, the refractive cover is configured to include a transparent material with a refractive index greater than that of air.

In an embodiment, the refractive cover is configured to be rotationally symmetric or rotationally substantially symmetric about the central axis of the LED.

In an embodiment, the LED is configured to be provided as an array of a plurality of LEDs on the upper surface of the substrate, and wherein the refractive cover is configured to be provided as a plurality of refractive covers to correspond respectively to the plurality of LEDs.

According to an aspect of the disclosure, a method for manufacturing a display device, the method includes: forming a Light Emitting Diode (LED) and a first refractive cover on an upper surface of a substrate, the first refractive cover including a through hole configured to be filled with a first transparent material and be rotationally symmetric or rotationally substantially symmetric about a central axis of the LED; jetting a second transparent material to fill the through hole; curing the second transparent material; disposing a liquid crystal panel in front of the substrate, wherein the first refractive cover includes: a first refractive surface configured to: be spaced apart from the LED by a preset distance, be positioned on the upper surface of the substrate, and be parallel to the central axis of the LED or be inclined within a first angle from the central axis of the LED; and a second refractive surface configured to be a curved surface in which a second angle between a tangent line and the central axis of the LED increases from a region connected to an upper portion of the first refractive surface toward a direction of the central axis of the LED, and configured to be connected to an upper portion of the through hole.

In an embodiment, the cured second transparent material is configured to form a second refractive cover including a third refractive surface, and wherein the third refractive surface is connected to an upper portion of the second refractive surface and is perpendicular to the central axis of the LED.

In an embodiment, the method further includes adjusting a jet amount of the second transparent material to adjust a curvature of the third refractive surface.

According to an aspect of the disclosure, a method for manufacturing a display device, the method includes: forming a Light Emitting Diode (LED) and a first refractive cover including a first refractive surface and a through hole on an upper surface of a substrate, the first refractive surface being configured to be filled with a first transparent material, be spaced apart from the LED by a predetermined distance, and be parallel to a central axis of the LED, and the through hole being configured to be rotationally symmetric or rotationally substantially symmetric about the central axis of the LED; jetting a second transparent material to a center of the through hole, to allow the second transparent material to be accumulated higher than an upper portion of the first refractive cover; pressurizing the second transparent material from a position corresponding to the central axis of the LED using a flat plane; curing the pressurized second transparent material; and disposing a liquid crystal panel in front of the substrate, wherein the cured second transparent material is configured to form a second refractive cover including a second refractive surface and a third refractive surface, wherein the second refractive surface is configured to be a curved surface in which a second angle between a tangent line and the central axis of the LED increases from a region connected to an upper portion of the first refractive surface toward a direction of the central axis of the LED, and wherein the third refractive surface is configured to be a plane connected to an upper portion of the second refractive surface and perpendicular to the central axis of the LED.

According to an embodiment, a display device uses a Distributed Bragg Reflector (DBR) Light Emitting Diode (LED), that has light distribution of high beam angle, and a refractive cover capable of increasing light extraction efficiency through a simple dispensing process, thereby implementing an ultra-slim backlight unit providing uniform back light without Mura effect while increasing productivity and price competitiveness.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 24 is a diagram illustrating a case where a second refractive cover of a refractive cover according to an embodiment is formed.

DETAILED DESCRIPTION

Figure 1:
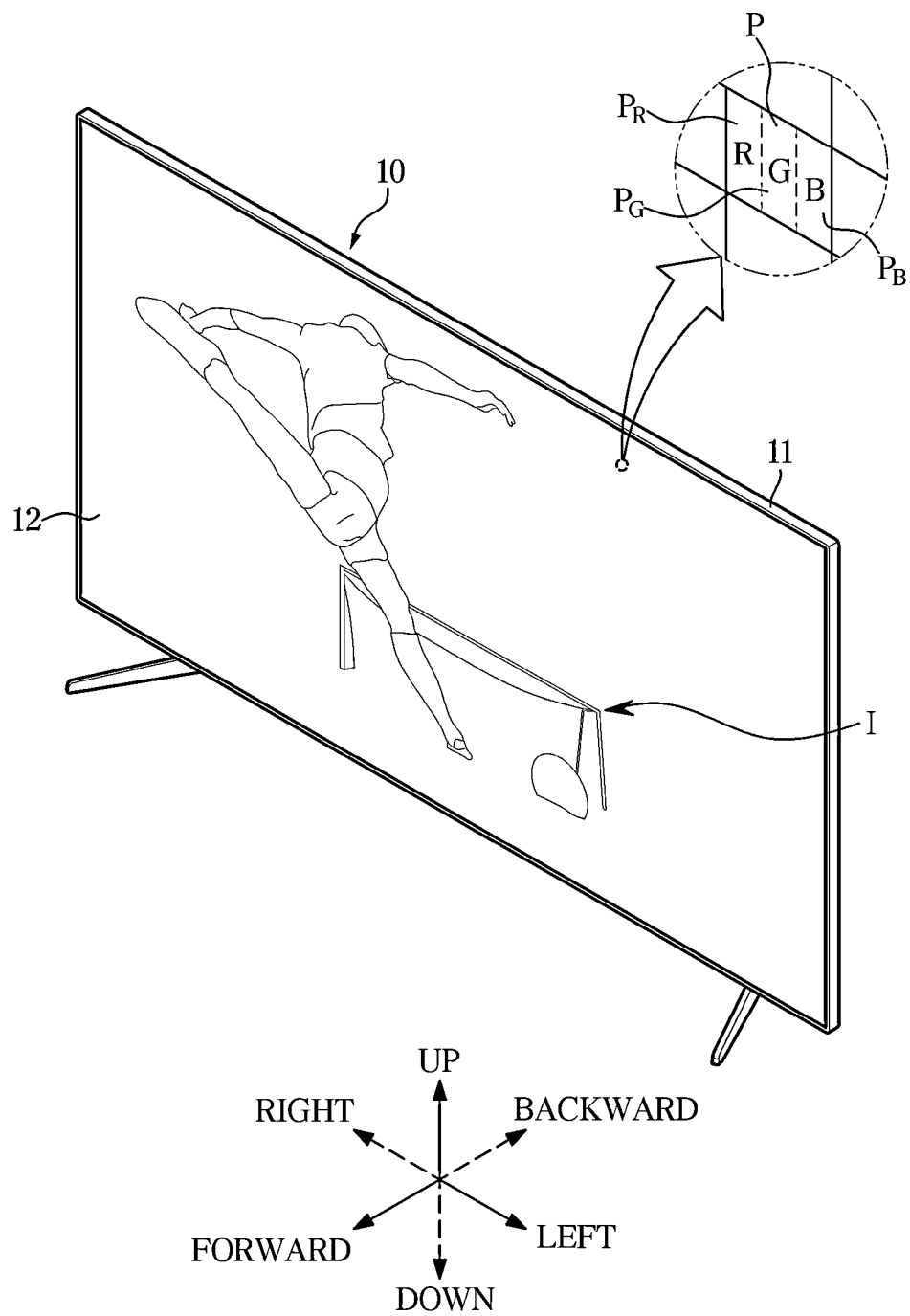
FIG. 1 illustrates an example of an exterior of a display device according to an embodiment.

Embodiments described in the disclosure and configurations shown in the drawings are merely examples of the embodiments of the disclosure, and may be modified in various different ways at the time of filing of the application to replace the embodiments and drawings of the disclosure.

Throughout the specification, it will be understood that when an element is referred to as being "connected" to another element, it may be directly or indirectly connected to the other element, wherein the indirect connection includes "connection" via a wireless communication network.

Further, terms used herein are only for the purpose of describing particular embodiments and are not intended to limit to the disclosure. The singular form is intended to include the plural form as well, unless the context clearly indicates otherwise. It should be further understood that the terms "include", "comprise", "have" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc., may be used herein to describe various elements, the elements are not restricted by the terms, and the terms are only used to distinguish one element from another. For example, a first element could be termed a second element, and similarly, a second element could be termed a first element without departing from the scope of the disclosure.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

Hereinafter, embodiments according to the disclosure will be described in detail with reference to the accompanying drawings.

FIG. 1 illustrates an example of an exterior of a display device according to an embodiment.

Referring to FIG. 1, a display device 10 is a device capable of processing an image signal received from the outside and visually displaying a processed image. Hereinafter, a case in which the display device 10 is a television (TV) is exemplified, but is not limited thereto. For example, the display device 10 may be implemented in various forms, such as a monitor, a portable multimedia device, a portable communication device, and the like, and the form of the display device 10 is not limited as long as it is a device that visually displays an image.

In addition, the display device 10 may be a Large Format Display (LFD) installed outdoors, such as on a roof of a building or at a bus stop. The outdoors is not necessarily limited to the outdoors, and the display device 10 according to an embodiment may be installed wherever a large number of people may enter and exit, even indoors such as at subway stations, shopping malls, movie theaters, office buildings, and stores.

The display device 10 may receive content including a video signal and an audio signal from various content sources, and output video and audio corresponding to the video signal and the audio signal, respectively. For example, the display device 10 may receive content data through a broadcast reception antenna or a wired cable, receive content data from a content playback apparatus, or receive content data from a content-providing server of a content provider.

As shown in FIG. 1, the display device 10 may include a body 11 and a screen 12 for displaying an image I.

The body 11 forms an exterior of the display device 10, and components of the display device 10 for displaying the image I and performing various functions may be provided inside the body 101. In FIG. 1, the body 11 has a flat plate shape, but the shape of the body 11 is not limited to that shown in FIG. 1. For example, the body 11 may have a curved plate shape.

The screen 12 is formed on a front surface of the body 11, and display the image I. For example, the screen 12 may display a still image or a video, as well as a two-dimensional (2D) plane image or a three-dimensional (3D) stereoscopic image using binocular parallax of a user.

For example, the screen 12 may include a self-luminous panel (e.g., a Light Emitting Diode (LED) panel, or an Organic LED (OLED) panel) that may emit light by itself, or a non-self-luminous panel (e.g., a liquid crystal panel) that may transmit or block light emitted by a backlight unit (BLU) or the like.

A plurality of pixels P may be formed on the screen 12, and the image I displayed on the screen 12 may be formed by light emitted from each of the plurality of pixels P. For example, the image I may be formed on the screen 12 by combining light emitted from the plurality of pixels P like a mosaic.

Each of the plurality of pixels P may emit light of various brightness and various colors. In order to emit light of various colors, each of the plurality of pixels P may include sub-pixels $P_R$, $P_G$, and $P_B$.

The sub-pixels $P_R$, $P_G$, and $P_B$ may include a red sub-pixel $P_R$ capable of emitting red light, a green sub-pixel $P_g$ capable of emitting green light, and a blue sub-pixel $P_B$ capable of emitting blue light. For example, the red light may represent light having a wavelength of approximately 620 nm (nanometers, one billionth of a meter) to 750 nm, the green light may represent light having a wavelength of approximately 495 nm to 570 nm, and the blue light may represent light having a wavelength of approximately 450 nm to 495 nm.

By combining the red light of the red sub-pixel $P_R$, the green light of the green sub-pixel $P_G$, and the blue light of the blue sub-pixel $P_B$, each of the plurality of pixels P may emit light of various brightness and various colors.

Figure 2:
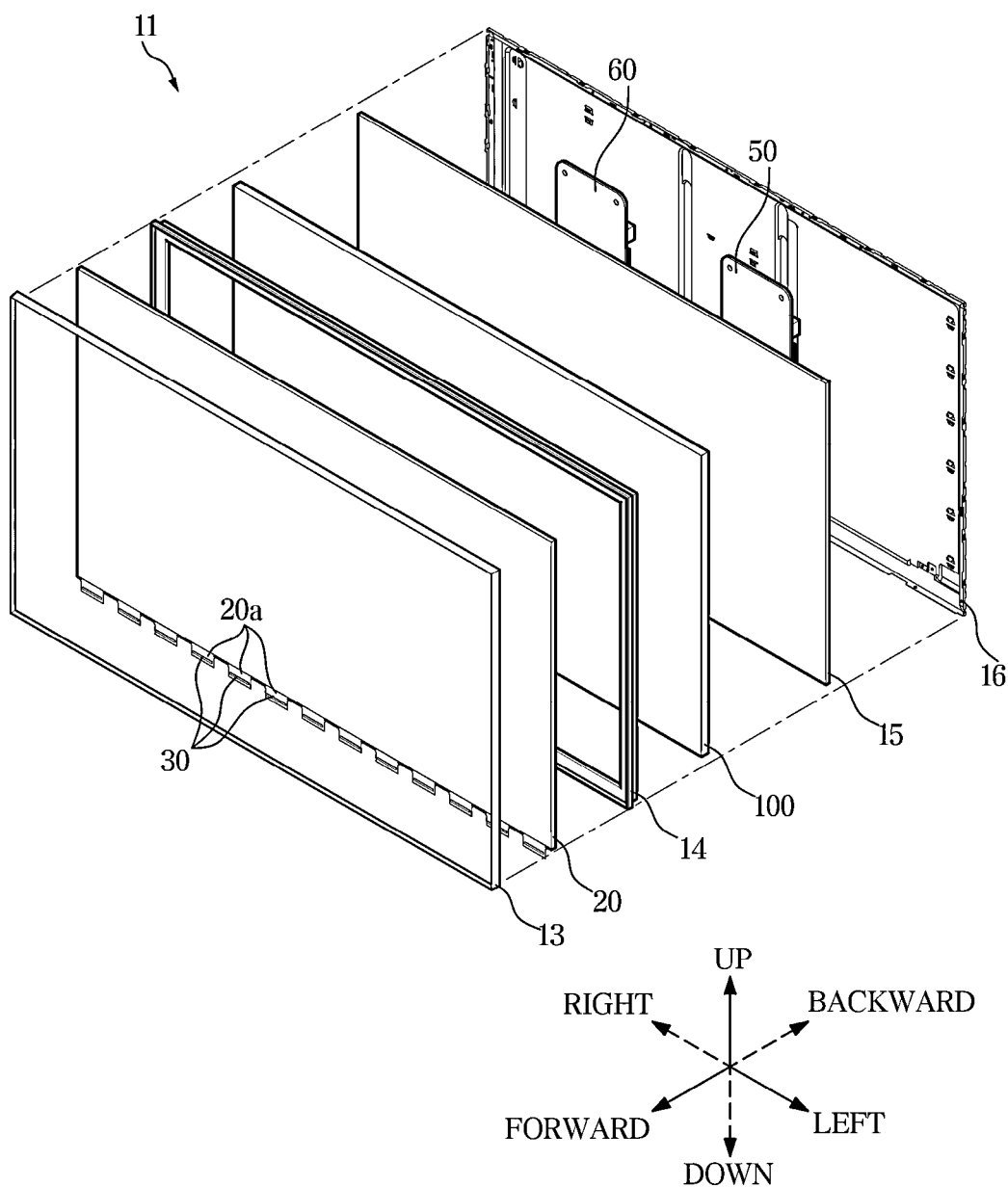
FIG. 2 illustrates an example of a structure of a display device according to an embodiment.
Figure 3:
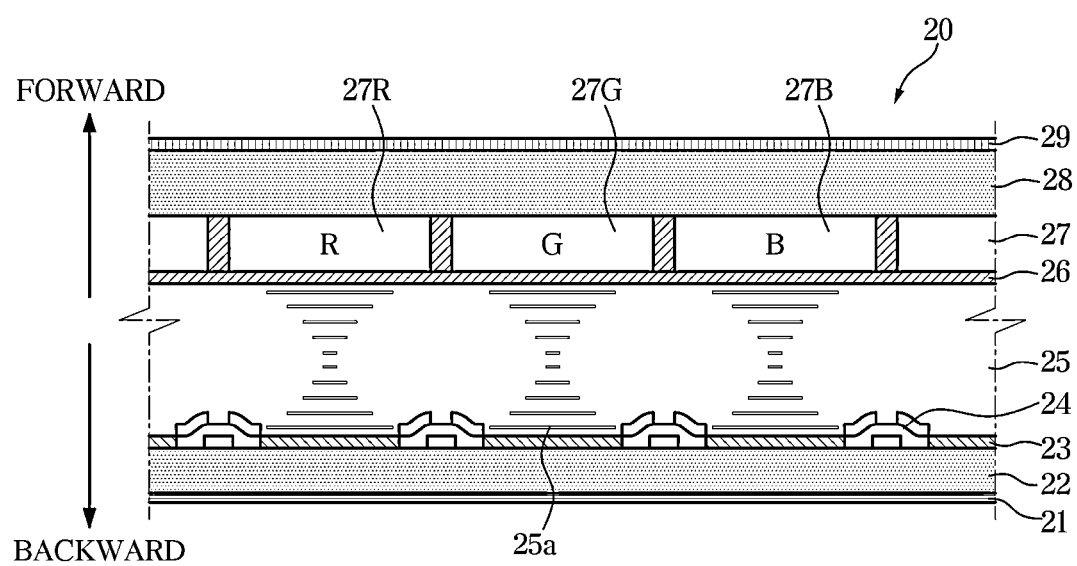
FIG. 3 illustrates an example of a liquid crystal panel included in a display device according to an embodiment.

FIG. 2 illustrates an example of a structure of the display device 10 according to an embodiment. FIG. 3 illustrates an example of a liquid crystal panel included in the display device 10 according to an embodiment.

As shown in FIG. 2, various components for generating an image I on the screen 12 may be provided in the body 11.

For example, the body 11 may include a backlight unit (BLU) 100 which is a surface light source, a liquid crystal panel 20 blocking or transmitting light emitted from the backlight unit 100, a control assembly 50 controlling operations of the backlight unit 100 and the liquid crystal panel 20, and a power supply assembly 60 supplying power to the backlight unit 100 and the liquid crystal panel 20. In addition, the body 11 may include a bezel 13, a frame middle mold 14, a bottom chassis 15, and a rear cover 16 for supporting the liquid crystal panel 20, the backlight unit 100, the control assembly 50, and the power supply assembly 60.

The backlight unit 100 may include a point light source that emits monochromatic light or white light, and may refract, reflect, and scatter the light to convert the light emitted from the point light source into a uniform surface light. As described above, the backlight unit 100 may refract, reflect, and scatter the light emitted from the point light source to emit a uniform surface light in a forward direction.

The backlight unit 100 will be described in more detail below.

The liquid crystal panel 20 may be provided in front of the backlight unit 100, and may block or transmit light emitted from the backlight unit 100 to form the image I.

A front surface of the liquid crystal panel 20 may form the screen 12 of the display device 10 described above, and the liquid crystal panel 20 may form the plurality of pixels P. The plurality of pixels P of the liquid crystal panel 20 may independently block or transmit the light emitted from the backlight unit 100. The light transmitted through the plurality of pixels P may form the image I to be displayed on the screen 12.

For example, as shown in FIG. 3, the liquid crystal panel 20 may include a first polarizing film 21, a first transparent substrate 22, a pixel electrode 23, a Thin-Film Transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin-film transistor 24, the liquid crystal layer 25, the common electrode 26, and the color filter 27. The first transparent substrate 22 and the second transparent substrate 28 may be formed of (or may include) tempered glass or transparent resin.

The first polarizing film 21 and the second polarizing film 29 may be provided on outer sides of the first transparent substrate 22 and the second transparent substrate 28, respectively. The first polarizing film 21 and the second polarizing film 29 may each transmit specific polarized light and block (reflect or absorb) the other polarized light. For example, the first polarizing film 21 may transmit light polarized in a first direction and block (reflect or absorb) the other polarized light. In addition, the second polarizing film 29 may transmit light polarized in a second direction and block (reflect or absorb) the other polarized light. In this instance, the first direction and the second direction may be orthogonal to each other. Thus, the polarized light passing through the first polarizing film 21 may not directly pass through the second polarizing film 29.

The color filter 27 may be provided on an inner side of the second transparent substrate 28. The color filter 27 may include, for example, a red filter 27R transmitting red light, a green filter 27G transmitting green light, and a blue filter 27B transmitting blue light. In addition, the red filter 27R, the green filter 27G, and the blue filter 27B may be disposed parallel to each other. A region occupied by the color filter 27 may correspond to the pixel P described above. A region occupied by the red filter 27R may correspond to the red sub-pixel PR, a region occupied by the green filter 27G may correspond to the green sub-pixel PG, and a region occupied by the blue filter 27B may correspond to the blue sub-pixel PB.

The pixel electrode 23 may be provided on an inner side of the first transparent substrate 22, and the common electrode 26 may be provided on the inner side of the second transparent substrate 28. The pixel electrode 23 and the common electrode 26 may be formed of (or may include) a metal material through which electricity is conducted and may generate an electric field for changing the arrangement of liquid crystal molecules 115a constituting the liquid crystal layer 25 to be described below.

The Thin-Film Transistor (TFT) 24 may be provided on the inner side of the second transparent substrate 28. The thin-film transistor 24 may be turned on (closed) or off (opened) by image data provided from a panel driver 30. In addition, by turning the thin-film transistor 24 on (closing) or off (opening), an electric field may be formed or removed from between the pixel electrode 23 and the common electrode 26.

The liquid crystal layer 25 may be formed between the pixel electrode 23 and the common electrode 26 and may be filled with liquid crystal molecules 25a. The liquid crystal may represent an intermediate state between a solid (crystal) and a liquid. The liquid crystal may exhibit optical properties depending on a change of the electric field. For example, an arrangement direction of the molecules constituting the liquid crystal may change depending on the change of the electric field. As a result, optical properties of the liquid crystal layer 25 may change according to the presence or absence of the electric field passing through the liquid crystal layer 25. For example, the liquid crystal layer 25 may rotate a polarization direction of light about an optical axis according to the presence or absence of the electric field. Accordingly, the polarized light that has passed through the first polarizing film 21 may be changed in polarization direction while passing through the liquid crystal layer 25 and may pass through the second polarizing film 29.

A cable 20a through which image data is transmitted to the liquid crystal panel 20 and a Display Driver Integrated circuit (DDI) 30 (hereinafter, referred to as the "panel driver") that processes digital image data and outputs an analog image signal are provided on one side of the liquid crystal panel 20.

The cable 20a may electrically connect between the control assembly 50/power supply assembly 60 and the panel driver 30, and may also electrically connect between the panel driver 30 and the liquid crystal panel 20. The cable 20a may include a flexible flat cable, a film cable, or the like that may be bendable.

The panel driver 30 may receive image data and power from the control assembly 50/the power supply assembly 60 through the cable 20a. Further, the panel driver 30 may provide image data and driving current to the liquid crystal panel 20 through the cable 20a.

In addition, the cable 20a and the panel driver 30 may be integrally implemented as a film cable, a Chip On Film (COF), a Tape Carrier Package (TCP), or the like. In other words, the panel driver 30 may be disposed on the cable 20a. However, the disclosure is not limited thereto, and the panel driver 30 may be disposed on the liquid crystal panel 20.

The control assembly 50 may include a control circuit that controls operations of the liquid crystal panel 20 and the backlight unit 100. For example, the control circuit may process a video signal and/or an audio signal received from an external content source, transmit the image data to the liquid crystal panel 20, and transmit dimming data to the backlight unit 100.

The power supply assembly 60 may include a power supply circuit supplying power to the liquid crystal panel 20 and the backlight unit 100. The power supply circuit may supply power to the control assembly 50, the backlight unit 100, and the liquid crystal panel 20.

The control assembly 50 and the power supply assembly 60 may be implemented with a printed circuit board and various circuits mounted on the printed circuit board. For example, the power supply circuit may include a condenser, a coil, a resistance element, a processor, and the like and a power supply circuit board on which these elements are mounted. In addition, the control circuit may include a memory, a processor, and a control circuit board on which these elements are mounted.

Figure 4:
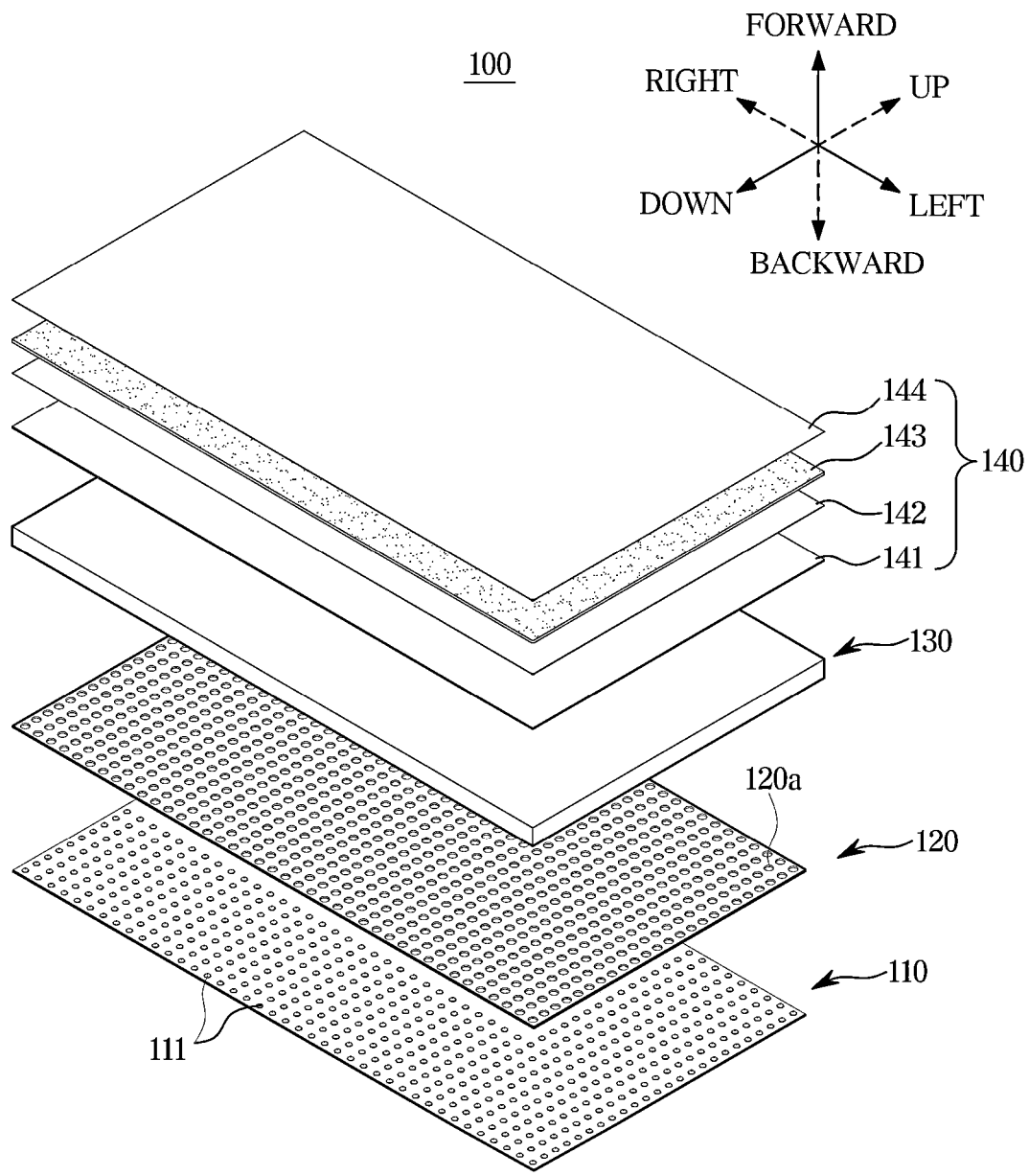
FIG. 4 illustrates an example of a backlight unit included in a display device according to an embodiment.
Figure 5:
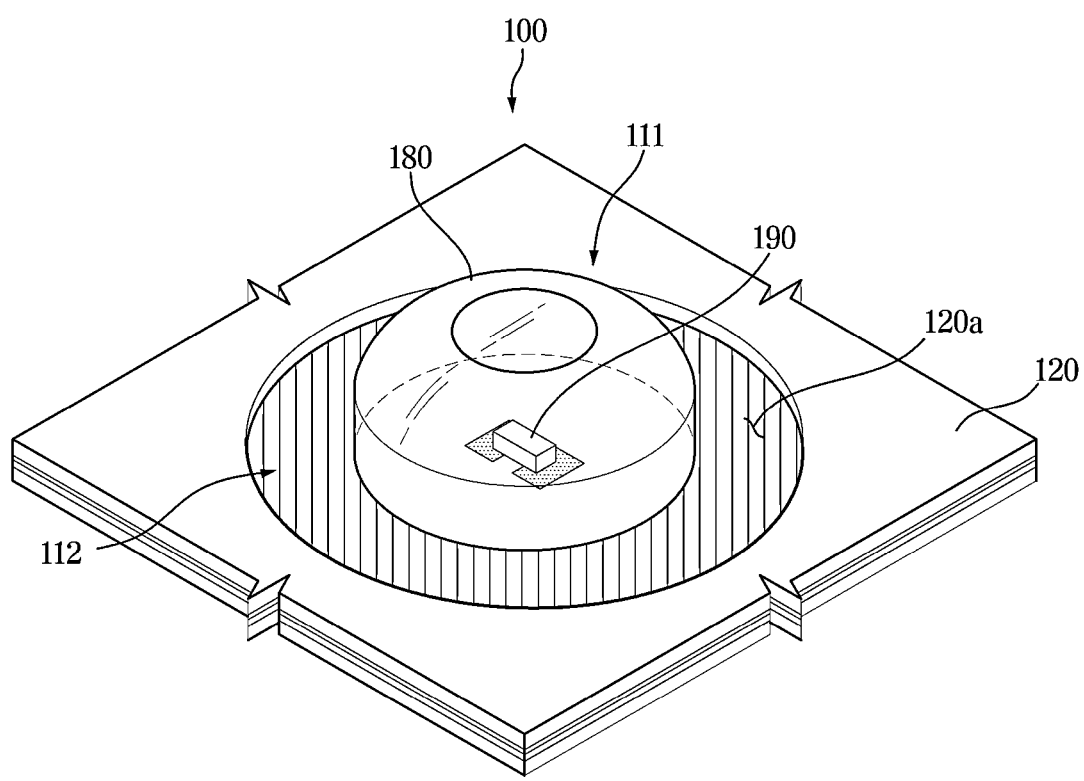
FIG. 5 illustrates an example of a light source included in a backlight unit according to an embodiment.

FIG. 4 illustrates an example of the backlight unit 100 included in the display device 10 according to an embodiment. FIG. 5 illustrates an example of a light source included in the backlight unit 100 according to an embodiment.

As shown in FIG. 4, the backlight unit 100 according to an embodiment may include a light source module 110 generating light, a reflector sheet 120 reflecting light, a diffuser plate 130 uniformly diffusing light, and an optical sheet 140 improving luminance of the output light.

The light source module 110 may include a plurality of light sources 111 emitting light, and a substrate 112 fixedly supporting the plurality of light sources 111.

The plurality of light sources 111 may be arranged in a predetermined pattern to allow light to be emitted with uniform luminance. The plurality of light sources 111 may be arranged to allow a distance between a single light source and each light source adjacent thereto to be the same.

For example, as shown in FIG. 4, the plurality of light sources 111 may be aligned in rows and columns. Accordingly, the plurality of light sources may be arranged to form an approximate square by four adjacent light sources. In addition, any one light source is disposed adjacent to four light sources, and a distance between the single light source and each of the four light sources adjacent thereto may be substantially the same.

The plurality of light sources may be arranged to allow an approximately equilateral triangle to be formed by three adjacent light sources. In this case, a single light source may be disposed adjacent to six light sources, and a distance between the single light source and each of the six adjacent light sources may be approximately the same.

However, the arrangement in which the plurality of light sources 111 are disposed is not limited to that described above, and the plurality of light sources 111 may be disposed in various patterns to allow light to be emitted with uniform luminance.

The light source 111 may employ an element capable of emitting monochromatic light (light having a specific range of wavelengths or light with one peak wavelength, for example, blue light) or white light (light having a plurality of peak wavelengths, for example, mixed light of red light, green light, and blue light) in various directions by receiving power.

As shown in FIG. 5, each of the plurality of light sources 111 may include a Light Emitting Diode (LED) 190 and a refractive cover 180.

In order to reduce a thickness of the display device 10, the thickness of the backlight unit 100 may also be reduced. In order to reduce the thickness of the backlight unit 100, each of the plurality of light sources 111 is thinned and a structure thereof is simplified.

The LED 190 may be directly attached to the substrate 112 in a chip on board (COB) manner. For example, the light source 111 may include the LED 190 in which an LED chip or an LED die is directly mounted on the substrate 112 without separate packaging.

The LED 190 may be manufactured as a flip-chip type LED. In the flip-chip type LED 190, when an LED, which is a semiconductor element, is attached to the substrate 112, an electrode pattern of the semiconductor element may be directly fused to the substrate 112 without using an intermediate medium, such as a metal lead (wire) or a Ball Grid Array (BGA). As described above, because the metal lead (wire) or BGA is omitted, the light source 111 including the flip-chip type LED 190 may be miniaturized.

Although the flip-chip type LED 190 directly attached to the substrate 112 in a Chip On Board (COB) manner has been described above, the light source 111 is not limited to the flip-chip type LED. For example, the light source 111 may include a package type LED.

The refractive cover 180 may cover the LED 190. The refractive cover 180 may prevent or suppress damage to the LED 190 due to an external mechanical action and/or damage to the LED 190 due to a chemical action.

The refractive cover 180 may be provided in a shape of cylindrical column with a flat-topped dome. The shape of the refractive cover 180 is described in detail later.

The refractive cover 180 may be formed of (or may include) a silicone or epoxy resin. For example, molten silicone or epoxy resin may be discharged onto the LED 190 through a nozzle or the like, and then the discharged silicone or epoxy resin may be cured to form the refractive cover 180.

The refractive cover 180 may have a diameter of approximately 10 mm or less, and a height of approximately 5 mm or less. Preferably, the refractive cover 180 may have a diameter of approximately 3 mm or less, and a height of approximately 1 mm or less.

The refractive cover 180 may be optically transparent or semi-transparent. The light emitted from the LED 190 may be emitted to the outside through the refractive cover 180.

In this instance, the dome-shaped refractive cover 180 may refract light like a lens. For example, the light emitted from the LED 190 may be dispersed by being refracted by the refractive cover 180.

As described above, the refractive cover 180 may prevent or suppress damage to the LED 190 due to an external mechanical action and/or due to a chemical action and/or due to an electric action, while dispersing light emitted from the LED 190.

Light dispersion of the refractive cover 180 is described in detail later.

The substrate 112 may fix the plurality of light sources 111 to prevent positions of the light sources 111 from being changed. In addition, the substrate 112 may supply each light source 111 with power for the light source 111 to emit light.

The substrate 112 may fix the plurality of light sources 111. The substrate 112 may be formed of (or may include) a synthetic resin, tempered glass, or a Printed Circuit Board (PCB) on which a conductive power supply line for supplying power to the light source 111 is formed.

In this instance, the LED 190 may be provided as an array of a plurality of LEDs 190 on an upper surface of the substrate 112, and the refractive cover 180 may be provided as a plurality of refractive covers to correspond respectively to the plurality of LEDs 190.

The reflector sheet 120 may allow light emitted from the plurality of light sources 111 to be reflected forward or in a direction close to the forward direction.

A plurality of through holes 120a corresponding respectively to the plurality of light sources 111 of the light source module 110 may be formed in the reflector sheet 120. The light sources 111 of the light source module 110 may pass through the through holes 120a and protrude forward of the reflector sheet 120. With such an arrangement, the plurality of light sources 111 may emit light at the front of the reflector sheet 120. The reflector sheet 120 may allow light emitted from the plurality of light sources 111 toward the reflector sheet 120 to be reflected toward the diffuser plate 130.

The diffuser plate 130 may be disposed in front of the light source module 110 and the reflector sheet 120. The diffuser plate 130 may uniformly disperse the light emitted from the light sources 111 of the light source module 110.

As described above, the plurality of light sources 111 may be equidistantly located on a rear surface of the backlight unit 100. As a result, non-uniformity of luminance may occur depending on the positions of the plurality of light sources 111.

To eliminate the non-uniformity of luminance due to the plurality of light sources 111, the diffuser plate 130 may diffuse the light emitted from the plurality of light sources 111 within the diffuser plate 130. In other words, the diffuser plate 130 may uniformly emit non-uniform light forward from the plurality of light sources 111.

The optical sheet 140 may include various sheets for improving luminance and uniformity of luminance. For example, the optical sheet 140 may include a light conversion sheet 141, a diffuser sheet 142, a prism sheet 143, a reflective polarizing sheet 144, and the like.

The optical sheet 140 is not limited to the sheet or film shown in FIG. 4, and may include a variety of sheets or films such as a protective sheet, and the like.

Figure 6:
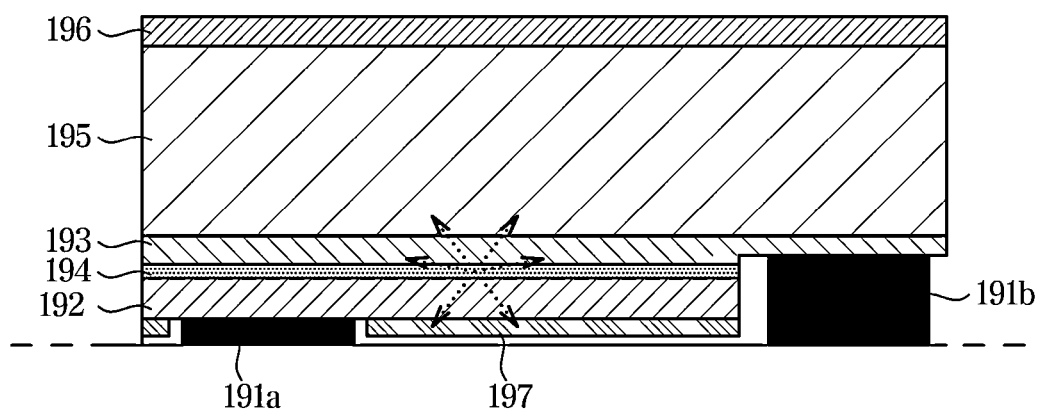
FIG. 6 illustrates an example of a Light Emitting Diode (LED) included in a backlight unit according to an embodiment.
Figure 7:
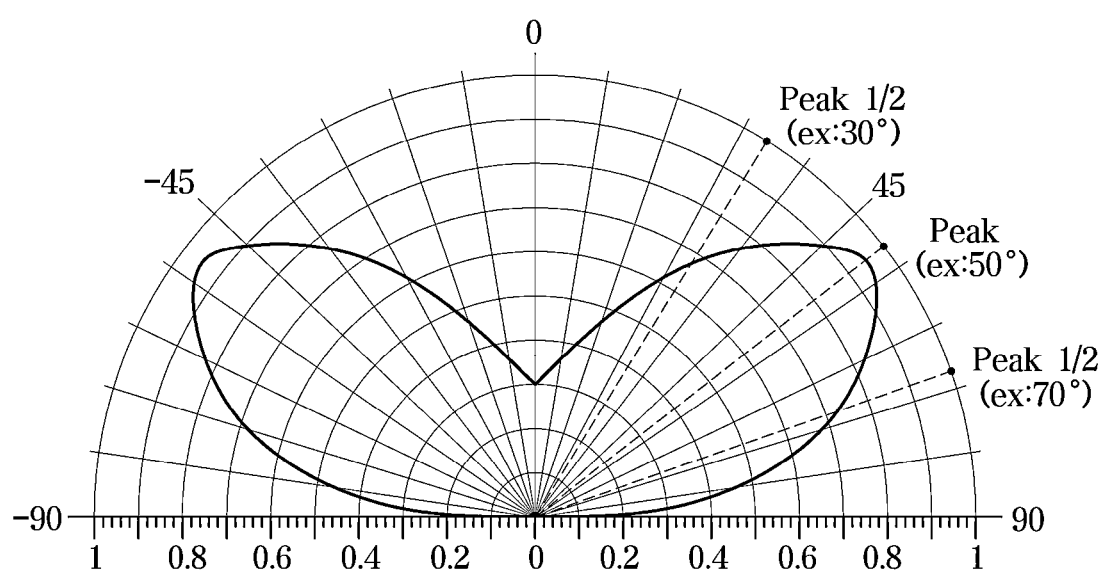
FIG. 7 illustrates an intensity of light in the LED shown in FIG. 6 according to emission angles.

FIG. 6 illustrates an example of the LED 190 included in the backlight unit 100 according to an embodiment. FIG. 7 illustrates an intensity of light in the LED 190 shown in FIG. 6 according to emission angles.

Referring to FIG. 6, the LED 190 may include a transparent substrate 195, an n-type semiconductor layer 193, and a p-type semiconductor layer 192. In addition, a Multi Quantum Well (MQW) layer 194 ("quantum well layer 194" or "light emitting layer 194", hereinafter) is formed between the n-type semiconductor layer 193 and the p-type semiconductor layer 192.

The transparent substrate 195 may be a base of a p-n junction capable of emitting light. For example, the transparent substrate 195 may include sapphire (Al2O3) including a crystal structure similar to that of the semiconductor layers 193 and 192.

As the n-type semiconductor layer 193 and the p-type semiconductor layer 192 are bonded to each other, a p-n junction may be implemented. A depletion region may be formed between the n-type semiconductor layer 193 and the p-type semiconductor layer 192. In the depletion layer, electrons of the n-type semiconductor layer 193 and holes of the p-type semiconductor layer 192 may recombine. Light may be emitted by recombination of electrons and holes.

For example, the n-type semiconductor layer 193 may include n-type gallium nitride (n-type GaN). In addition, the p-type semiconductor layer 192 may also include p-type gallium nitride (p-type GaN). An energy band gap of gallium nitride (GaN) is approximately 3.4 eV (electron volt), which emits light with a wavelength shorter than 400 nm. Accordingly, deep blue or ultraviolet light may be emitted from the junction of the n-type semiconductor layer 193 and the p-type semiconductor layer 192.

The n-type semiconductor layer 193 and the p-type semiconductor layer 192 are not limited to gallium nitride, and various semiconductor materials may be used according to light that is required.

A first electrode 191a of the LED 190 is in electrical contact with the p-type semiconductor layer 192, and a second electrode 191b is in electrical contact with the n-type semiconductor layer 193. The first electrode 191a and the second electrode 191b may function not only as electrodes but also as reflectors that reflect light.

In response to a voltage being applied to the LED 190, holes may be supplied to the p-type semiconductor layer 192 through the first electrode 191a, and electrons may be supplied to the n-type semiconductor layer 193 through the second electrode 191b. The electrons and holes may recombine in the depletion layer formed between the p-type semiconductor layer 192 and the n-type semiconductor layer 193. In this instance, while electrons and holes recombine, energy (e.g., kinetic energy and potential energy) of electrons and holes may be converted into light energy. In other words, in response to recombination of electrons and holes, light may be emitted.

In this instance, the energy band gap of the quantum well layer 194 is less than that of the p-type semiconductor layer 192 and/or the n-type semiconductor layer 193. As a result, holes and electrons may be trapped in the quantum well layer 194.

The holes and electrons trapped in the quantum well layer 194 may easily recombine with each other in the quantum well layer 194. As a result, efficiency of light generation of the LED 190 may be improved.

Light having a wavelength corresponding to the energy gap of the quantum well layer 194 may be emitted from the quantum well layer 194. For example, blue light between 420 nm and 480 nm may be emitted from the quantum well layer 194. As described above, the quantum well layer 194 may correspond to a light emitting layer that emits blue light.

Light generated by recombination of electrons and holes is not emitted in a specific direction, and may be emitted in all directions as shown in FIG. 6. However, in the case of light emitted from a surface, such as the quantum well layer 194, the intensity of light emitted in a direction perpendicular to a light emitting surface is greatest and the intensity of light emitted in a direction parallel to the light emitting surface is smallest.

A first reflective layer 196 may be disposed on an outer side (an upper side of the transparent substrate on the drawing) of the transparent substrate 195. That is, the first reflective layer 196 may be disposed on the upper side of the light emitting layer 194. In addition, a second reflective layer 197 may be disposed on an outer side (a lower side of the p-type semiconductor layer on the drawing) of the p-type semiconductor layer 192. Accordingly, the transparent substrate 195, the n-type semiconductor layer 193, the quantum well layer 194, and the p-type semiconductor layer 192 may be disposed between the first reflective layer 196 and the second reflective layer 197.

The first reflective layer 196 and the second reflective layer 197 may each reflect a part of the incident light, and pass another part of the incident light.

For example, the first reflective layer 196 and the second reflective layer 197 may reflect light having a wavelength included in a specific wavelength range, and pass light having a wavelength outside the specific wavelength range. For example, the first reflective layer 196 and the second reflective layer 197 may reflect blue light having a wavelength between 420 nm and 480 nm emitted from the quantum well layer 194.

In addition, the first reflective layer 196 and the second reflective layer 197 may reflect incident light having a specific incident angle, and transmit light outside the specific incident angle. As described above, the first reflective layer 196 and the second reflective layer 197 may be Distributed Bragg Reflector (DBR) layers formed by laminating materials having different refractive indices so as to have various refractive indices according to incident angles.

For example, the first reflective layer 196 may reflect light incident at a small incident angle, and pass light incident at a large incident angle. In addition, the second reflective layer 197 may reflect or pass light incident at a small incident angle, and reflect light incident at a large incident angle. Here, the incident light may be blue light having a wavelength between 420 nm and 480 nm.

The intensity of light emitted in a direction perpendicular to the upper surface of the LED 190 (in a direction toward an upper side of the LED in the drawing) may be less than the intensity of light emitted in a direction inclined with respect to the upper surface of the LED 190 (for example, a direction inclined by 40 degrees to 60 degrees with respect to the direction toward the upper side of the LED in the drawing).

In this instance, a beam angle of light emitted in the direction perpendicular to the upper surface of the LED 190 may be defined as 0°, and light emitted in a direction inclined with respect to the upper surface of the LED 190 may be defined as having a beam angle greater than 0° and less than or equal to 90°.

Figure 9:
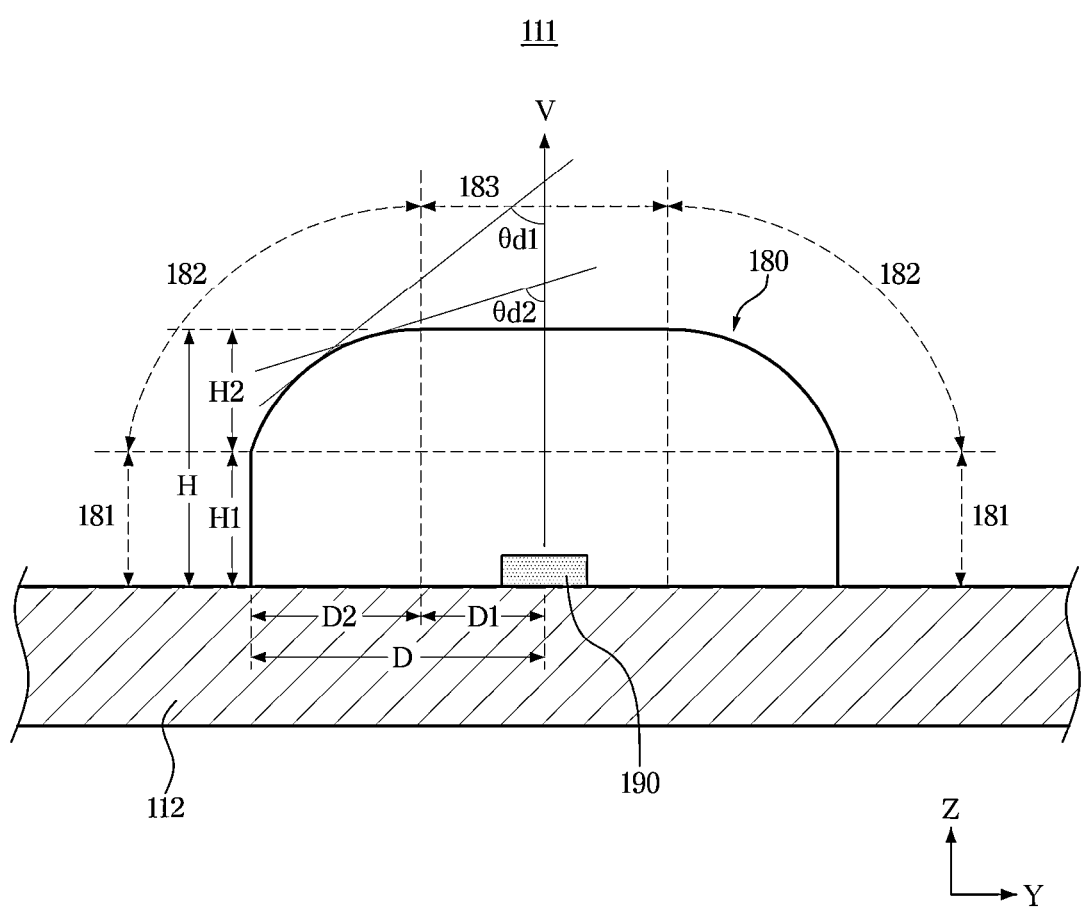
FIG. 9 illustrates an example of a side cross-section of a light source according to an embodiment.

As shown in FIG. 9, the intensity of light emitted at an angle of approximately 40 degrees to 60 degrees with respect to a vertical axis of the LED 190 may be greatest. For example, the LED 190 may have a peak light intensity at a point in which the beam angle is 50°. That is, among light emitted from the LED 190, light having a beam angle of 50° may have the greatest intensity.

In addition, in a region in which the LED 190 has a beam angle lower than the beam angle of the peak light intensity, the LED 190 may have light intensity corresponding to half of the peak light intensity. For example, the LED 190 may have light intensity (½ of Peak) corresponding to half of the peak light intensity at a point in which the beam angle is 30°.

In addition, in a region in which the LED 190 has a beam angle higher than the beam angle of the peak light intensity, the LED 190 may have light intensity corresponding to half of the peak light intensity. For example, the LED 190 may have light intensity (½ of Peak) corresponding to half of the peak light intensity at a point in which the beam angle is 70°.

As described above, the LED 190 may have a light profile of an approximate bat wing shape. Here, the light profile of the bat wing shape may represent a light profile in which the intensity of light emitted in an oblique direction (e.g., a direction having an angular interval of approximately 40 degrees to 60 degrees from the vertical axis perpendicular to the light emitting surface) is greater than the intensity of light emitted in a direction perpendicular to the light emitting layer 194 (e.g., a multi quantum well).

Due to the LED 190 having a bat wing-shaped light profile, the number of LEDs 190 included in the display device 10 may be reduced.

In order to improve an image quality of the display device 10, the backlight unit 100 may require to emit surface light with uniform luminance. For example, in response to the number of LEDs, which are a point light source, being reduced, a difference between the brightness in a region where the LEDs are located and the brightness in a region where the LEDs are not located (a region between the light emitting diodes) may increase. In other words, in response to the decrease in the number of LEDs which are point light sources, a luminance uniformity of the surface light emitted by the backlight unit 100 may deteriorate.

In this instance, by using the LED 190 having the bat wing-shaped light profile, the difference between the brightness in the region where the LEDs are located and the brightness in the region between the light emitting diodes may be reduced. As a result, the number of LEDs 190 may be reduced.

Furthermore, as a thickness of the display device 10 is thinner, an Optical Distance (OD) for the light emitted from the LED, which is a point light source, to diffuse into a surface light becomes shorter. As a result, the luminance uniformity of the surface light emitted by the backlight unit 100 may deteriorate. To maintain the luminance uniformity, the number of LEDs may be increased.

In this instance, an increase in the number of LEDs may be minimized by using the LED 190 having the bat wing-shaped light profile.

As described above, the LED 190 having a bat wing-shaped light profile may improve the luminance uniformity of the backlight unit 100. Accordingly, the number of LEDs may be reduced while maintaining the luminance uniformity of the backlight unit 100.

Figure 8:
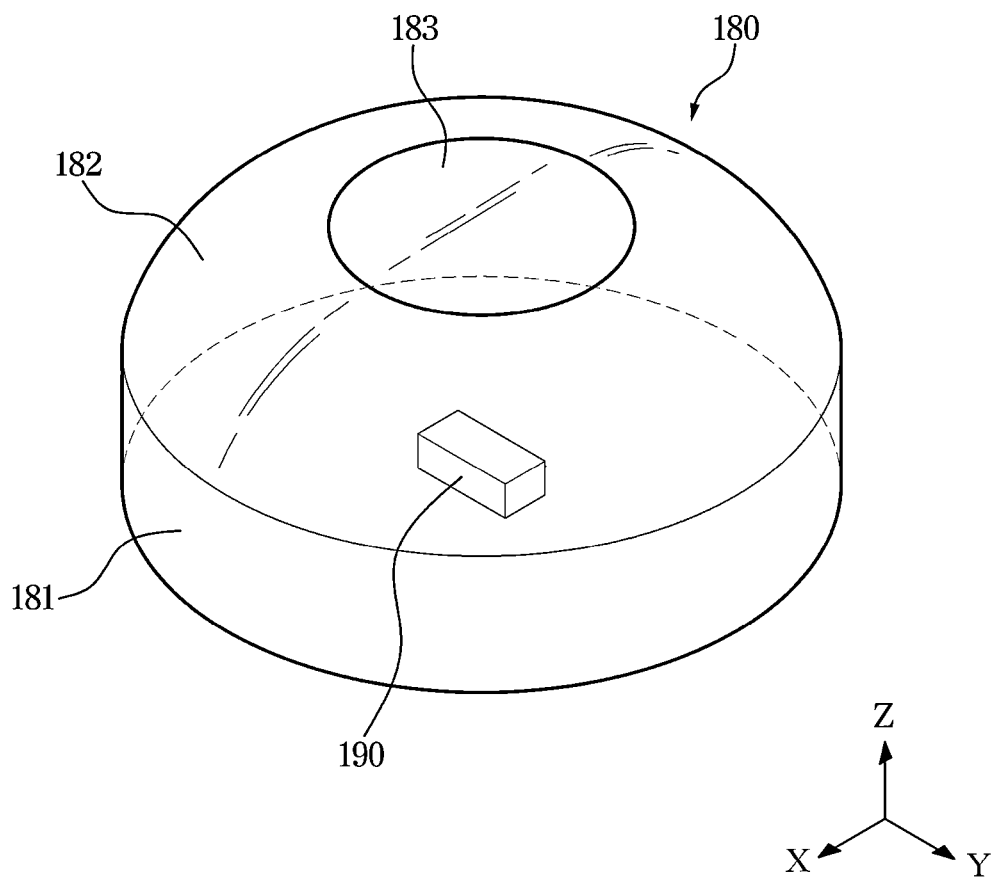
FIG. 8 illustrates an example of an exterior of a light source according to an embodiment.

FIG. 8 illustrates an example of an exterior of the light source 111 according to an embodiment. FIG. 9 illustrates an example of a side cross-section of the light source 111 according to an embodiment.

Referring to FIG. 8 and FIG. 9, the light source 111 according to an embodiment may include the LED 190 emitting light, and the refractive cover 180 refracting the light emitted from the LED 190 and covering the LED 190.

The refractive cover 180 may surround the LED 190, that is, around the LED 190. The refractive cover 180 may be filled with a transparent material having a greater refractive index than air, thereby refracting the light emitted from the LED 190. The transparent material may be, for example, a silicone or epoxy resin, and the type thereof is not limited.

The refractive cover 180 surrounds the LED 190, thereby protecting the LED 190 as well as refracting the light emitted from the LED 190. Accordingly, light passing through the refractive cover 180 is more uniformly incident on the liquid crystal panel 20, and thus a light extraction efficiency of the LED 190 may be increased, and illumination uniformity may be secured without Mura effect even at a short optical distance, allowing a thickness of the backlight unit 100 to be reduced.

The refractive cover 180 may have a shape capable of optimally controlling a light intensity distribution of the LED 190 having a bat wing-shaped light profile by angular component or by region.

As shown in FIG. 8 and FIG. 9, the refractive cover 180 may be provided in a shape of cylindrical column with a flat-topped dome.

Specifically, the refractive cover 180 includes a first refractive surface 181 which is positioned on an upper surface of the substrate 112, is spaced apart from the LED 190 by a preset distance D, and is parallel to a central axis V of the LED 190, a second refractive surface 182 which is a curved surface in which an angle $\theta_d$ between a tangent line and the central axis V of the LED 190 increases from a region connected to an upper portion of the first refractive surface 181 toward a direction of the central axis V of the LED 190, and a third refractive surface 183 which is connected to an upper portion of the second refractive surface 182 and is perpendicular to the central axis V of the LED 190.

As described above, the refractive cover 180 surrounding the LED 190 may be provided in the shape of cylindrical column, which forms the first refractive surface 181, and topped with a dome with flat top (the upper portion forming the third refractive surface 183 and a remaining portion forming the second refractive surface 182).

The first refractive surface 181 of the refractive cover 180 may be located on the upper surface of the substrate 112, may be spaced apart from the center of the LED 190 by the preset distance D, and may be provided at a first height $H_1$ parallel to the central axis V of the LED 190. That is, the upper portion of the first refractive surface 181 may be spaced apart from the substrate 112 by the first height $H_1$. In this instance, the first refractive surface 181 may be rotationally symmetric or rotationally substantially symmetric about the central axis V of the LED 190.

The second refractive surface 182 of the refractive cover 180 may be connected to the upper portion of the first refractive surface 181, and may be a curved surface in which the angle $\theta_d$ between the tangent line and the central axis V of the LED 190 increases from the region connected to the upper portion of the first refractive surface 181 toward the direction of the central axis V of the LED 190.

For example, in a case where an angle between the central axis V of the LED 190 and a tangent line at a first point of the second refractive surface 182 is a first angle $\theta_{d1}$, a second angle $\theta_{d2}$, which is an angle between the central axis V of the LED 190 and a tangent line at a second point closer to the central axis V of the LED 190 than the first point, may be larger than the first angle $\theta_{d1}$.

In other words, a height of the second refractive surface 182 from the substrate 112 may increase at a constant rate, from the region connected to the upper portion of the first refractive surface 181 toward the direction of the central axis V of the LED 190.

In this instance, the second refractive surface 182 may be higher than the upper portion of the first refractive surface 181 by up to a second height $H_2$, and may be spaced apart from the first refractive surface 181 by up to a first horizontal distance $D_1$. That is, a region where the second refractive surface 182 is connected to the upper portion of the first refractive surface 181 may be spaced apart from the substrate 112 by the first height $H_1$, and a region where the second refractive surface 182 is connected to the third refractive surface 183 may be spaced apart from the substrate 112 by a third height H that is a sum of the first height $H_1$ and the second height $H_2$, and may be spaced apart from the first refractive surface 181 by the first horizontal distance $D_1$.

In addition, the second refractive surface 182 may be rotationally symmetric or rotationally substantially symmetric about the central axis V of the LED 190.

The third refractive surface 183 of the refractive cover 180 may be connected to the upper portion of the second refractive surface 182, and may be perpendicular to the central axis V of the LED 190. In this instance, the third refractive surface 183 may be rotationally symmetric or rotationally substantially symmetric about the central axis V of the LED 190 and may be provided in a circular shape with a radius of a second horizontal distance $D_2$.

Figure 10:
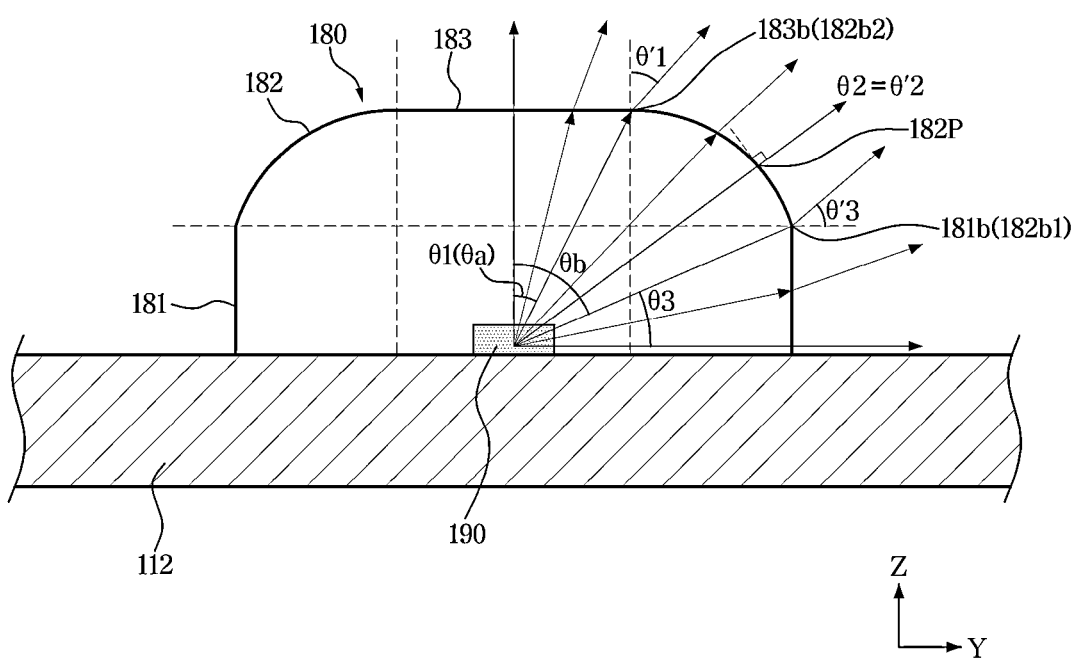
FIG. 10 is a diagram illustrating that light emitted from an LED according to an embodiment is refracted by a refractive cover.
Figure 11:
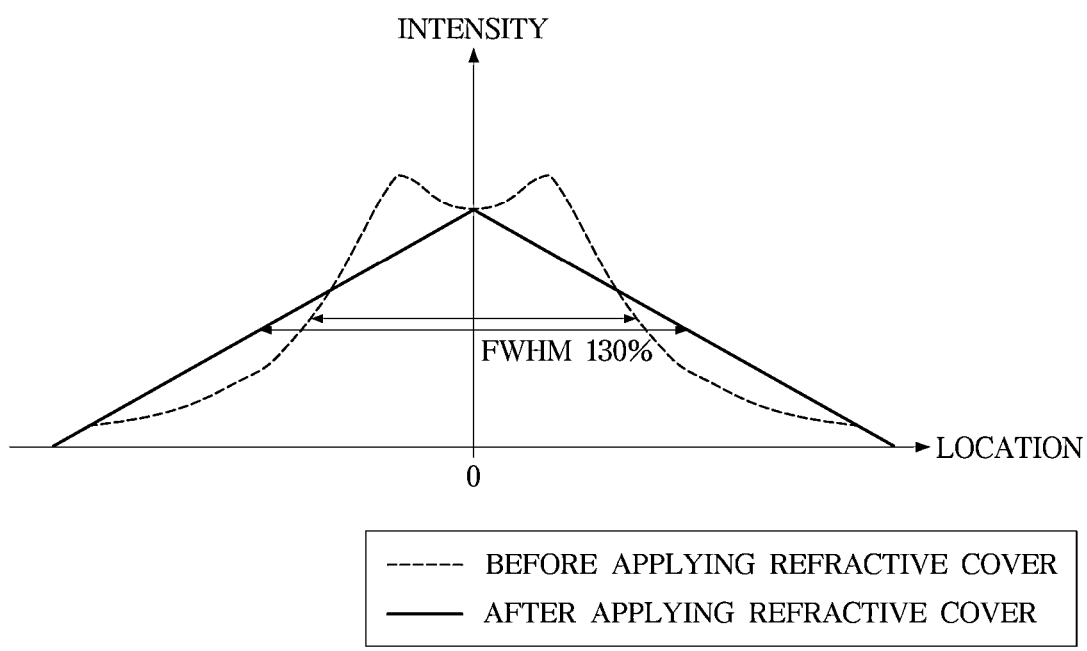
FIG. 11 is a diagram illustrating a light profile before and after applying a refractive cover in a single LED according to an embodiment.
Figure 12:
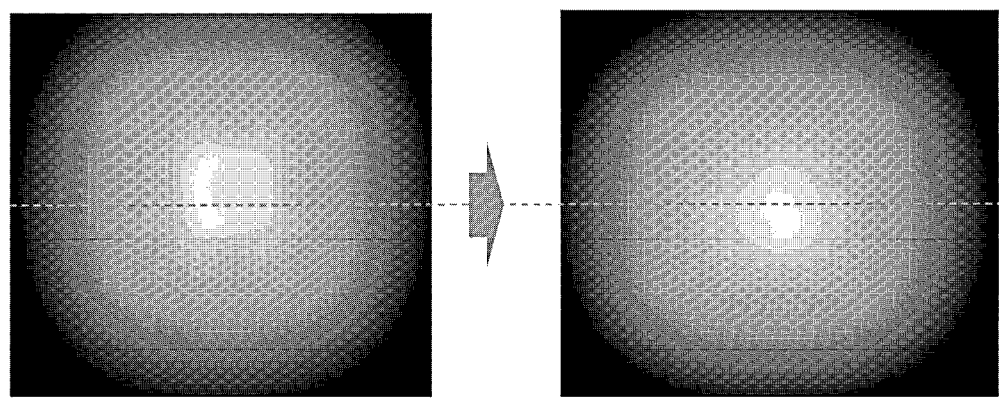
FIG. 12 is a diagram illustrating a light profile before and after applying a refractive cover in an LED array according to an embodiment.
Figure 12:
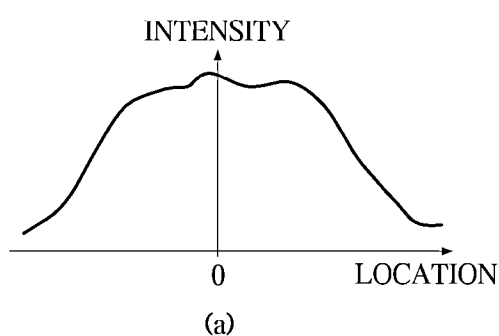
Figure 12:
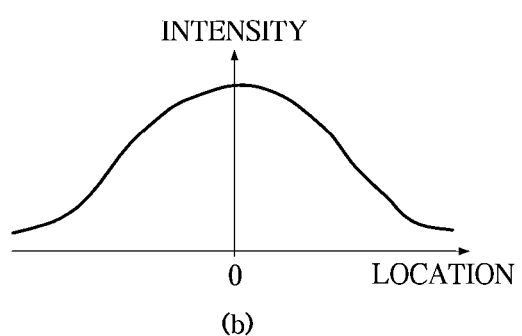

FIG. 10 is a diagram illustrating that light emitted from the LED 190 according to an embodiment is refracted by the refractive cover 180. FIG. 11 is a diagram illustrating a light profile before and after applying the refractive cover 180 in the single LED 190 according to an embodiment. FIG. 12 is a diagram illustrating a light profile before and after applying the refractive cover 180 in an LED array according to an embodiment.

Referring to FIG. 10, light emitted from the LED 190 according to an embodiment may have a beam angle between −90° and +90° based on a vertical axis of an upper surface of the LED 190. Hereinafter, although light having a beam angle from 0° to +90° will be described below, the description to be made may be equally applicable to light having a beam angle from 0° to −90°, except for being symmetrical.

Light having a beam angle of 0° by being emitted perpendicularly from the upper surface of the LED 190 may be emitted outside the refractive cover 180 through the third refractive surface 183, and may not be refracted upon passing through the third refractive surface 183. That is, for light with a beam angle of 0°, an incident angle $\theta_1$ and an emission angle (refraction angle) $\theta'_1$ may be equal to 0° at the third refractive surface 183.

For light emitted from the LED 190 toward the third refractive surface 183, the emission angle $\theta'_1$ may increase as the beam angle (same as the incident angle $\theta_1$) increases.

Light having a beam angle of $\theta_a$ may be incident on a boundary region 183b (182b2) between the third refractive surface 183 and the second refractive surface 182, and in response to the beam angle of the light becoming greater than $\theta_a$, the light may be incident on the second refractive surface 182.

That is, light having beam angle from 0 to $\theta_a$ may be incident on the third refractive surface 183 and may be emitted outside the refractive cover 180. In response to the beam angle being $\theta_a$, light may be emitted with a maximum emission angle $\theta'_1$.

The third refractive surface 183 may be provided in a planar shape to increase diffusion for light incident on the third refractive surface 183.

In addition, according to embodiments, the boundary region 183b (182b2) between the third refractive surface 183 and the second refractive surface 182 may be designed to have the beam angle $\theta_a$ greater than or equal to 10°.

Furthermore, according to embodiments, the boundary region 183b (182b2) between the third refractive surface 183 and the second refractive surface 182 may be designed to allow light having a light intensity equivalent to half of a peak light intensity (e.g., a beam angle of 30°) to pass through the third refractive surface 183. In other words, the third refractive surface 183 may include a region through which light, that has a light intensity equivalent to half of a maximum light intensity and is inclined at an angle less than a beam angle of light having a peak light intensity from the central axis of the LED 190, passes from among the light emitted from the LED 190.

Light having a beam angle between $\theta_a$ and $\theta_b$ may be incident on the second refractive surface 182 and may be emitted outside the refractive cover 180. The second refractive surface 182 may include a non-refractive point 182p where an incident angle $\theta_2$ and an emission angle $\theta'_2$ are the same.

Light having the beam angle $\theta_b$ may be incident on a boundary region 181b (182b1) between the second refractive surface 182 and the first refractive surface 181, and in response to the beam angle of the light becoming greater than $\theta_b$, the light may be incident on the first refractive surface 181.

In this instance, in response to the beam angle being increased from the beam angle $\theta_a$ to a beam angle at the non-refractive point 182p, the emission angle $\theta'_2$ of light may decrease, and in response to the beam angle being increased from the beam angle at the non-refractive point 182p to the beam angle $\theta_b$, the emission angle $\theta'_2$ of light may increase.

In this instance, the second refractive surface 182 may include a region through which light having a maximum light intensity passes, from among the light emitted from the LED 190. That is, light having the peak light intensity may pass through the second refractive surface 182. For example, in a case where the LED 190 has the light profile of FIG. 7, light having a beam angle of 50° may pass through second refractive surface 182. Depending on a curvature of the second refractive surface 182, a point through which light having the peak light intensity passes may be a point where the incident angle $\theta_2$ is equal to the emission angle $\theta'_2$.

Light having the beam angle $\theta_b$ or greater may be incident on the first refractive surface 181, and an emission angle $\theta'_3$ may decrease as the beam angle increases.

By refracting light having a high beam angle by the first refractive surface 181 to the front where the liquid crystal panel 20 is located, an ultra-high beam angle (background light) according to the bat wing-light profile of the LED 190 may be converted into effective light incident on the liquid crystal panel 20. Thus, light extraction efficiency may be increased.

In addition, according to embodiments, the boundary region 181b (182b2) between the second refractive surface 182 and the first refractive surface 181 may be designed to have the beam angle $\theta_b$ less than or equal to 80°.

Furthermore, according to embodiments, the boundary region 183b (182b2) between the third refractive surface 183 and the second refractive surface 182 may be designed to allow light having a light intensity equivalent to half of the peak light intensity (e.g., a beam angle of 70°) to pass through the first refractive surface 181. In other words, the first refractive surface 181 may include a region through which light, that has a light intensity equivalent to half of a maximum light intensity and is inclined at an angle greater than a beam angle of light having the peak light intensity from the central axis of the LED 190, passes from among the light emitted from the LED 190.

Referring to FIG. 11, for a light profile of the light source 111, in a case where the refractive cover 180 is not applied, a position of the light source 111 having a peak light intensity may be spaced apart from the central axis of the LED 190, and thus a dark spot may occur near the center of the LED 190, and a full width at half maximum may be narrow.

In contrast, in a case where the refractive cover 180 is applied, for a light profile of the light source 111, as a distance from the center of the LED 190 increases, a light intensity gradually decreases, resolving the dark spot near the center of the LED 190, and increasing the full width at half maximum (e.g., increased to 130%). Accordingly, luminance uniformity may be increased.

Referring to FIG. 12, in a case where the LED 190 according to an embodiment is provided in a 3×3 array and the refractive cover 180 is not applied to each of the LEDs 190, Mura effect may be caused by bright spots or dark spots, as shown in (a).

In contrast, in a case where the refractive cover 180 is applied to each of the LEDs 190, the bright spots or dark spots may be removed, as shown in (b), resulting in a higher level of illumination uniformity and increasing the luminance uniformity.

Figure 13:
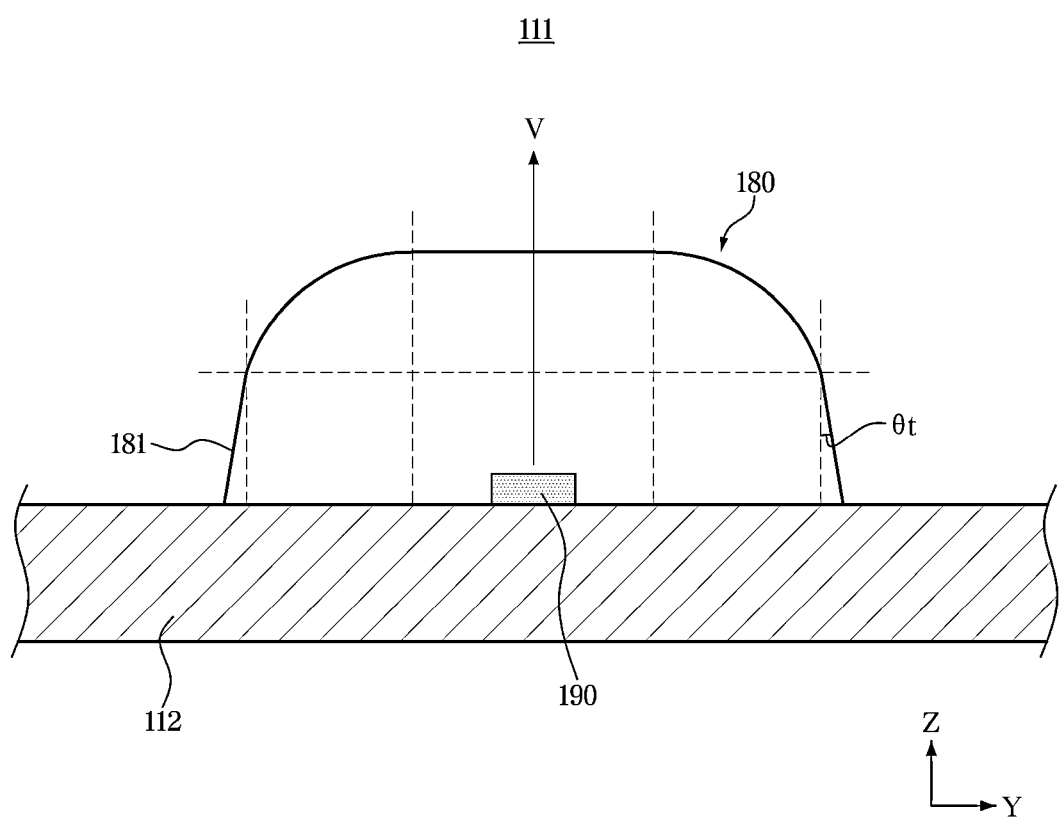
FIG. 13 and FIG. 14 are diagrams illustrating a case where a first refractive surface of a refractive cover according to an embodiment is a tilt surface.
Figure 14:
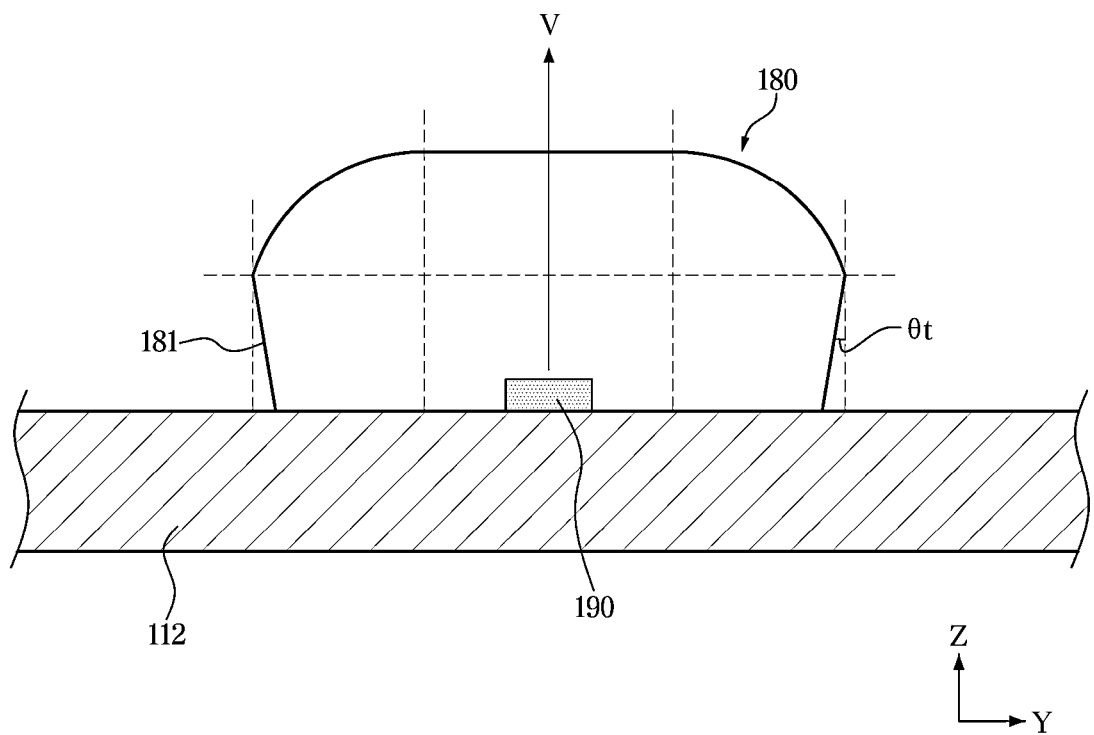

FIG. 13 and FIG. 14 are diagrams illustrating a case where a first refractive surface of a refractive cover according to an embodiment is a tilt surface.

Referring to FIG. 13 and FIG. 14, the first refractive surface 181 according to an embodiment may be provided as a tilt surface inclined within a first angle (e.g., 10°) from the central axis V of the LED 190.

For example, the first refractive surface 181 may be formed as a tilt surface inclined at a predetermined angle $\theta_t$ from the central axis V of the LED 190. As shown in FIG. 13, the first refractive surface 181 may be formed as a tilt surface in which a horizontal distance from the central axis V of the LED 190 becomes closer, as a distance from the substrate 112 increases. In this case, light incident on the first refractive surface 181 may be refracted more upwardly, increasing an effective light directed at the liquid crystal panel 20. Thus, light extraction efficiency may be increased.

For example, the first refractive surface 181 may be formed as a tilt surface inclined at the predetermined angle $\theta_t$ from the central axis V of the LED 190. As shown in FIG. 14, the first refractive surface 181 may be formed as a tilt surface in which a horizontal distance from the central axis V of the LED 190 becomes farther away, as the distance from the substrate 112 increases. In this case, light incident on the first refractive surface 181 may be refracted more downwardly, increasing diffusion of light. Thus, a larger illumination area may be secured.

Figure 15:
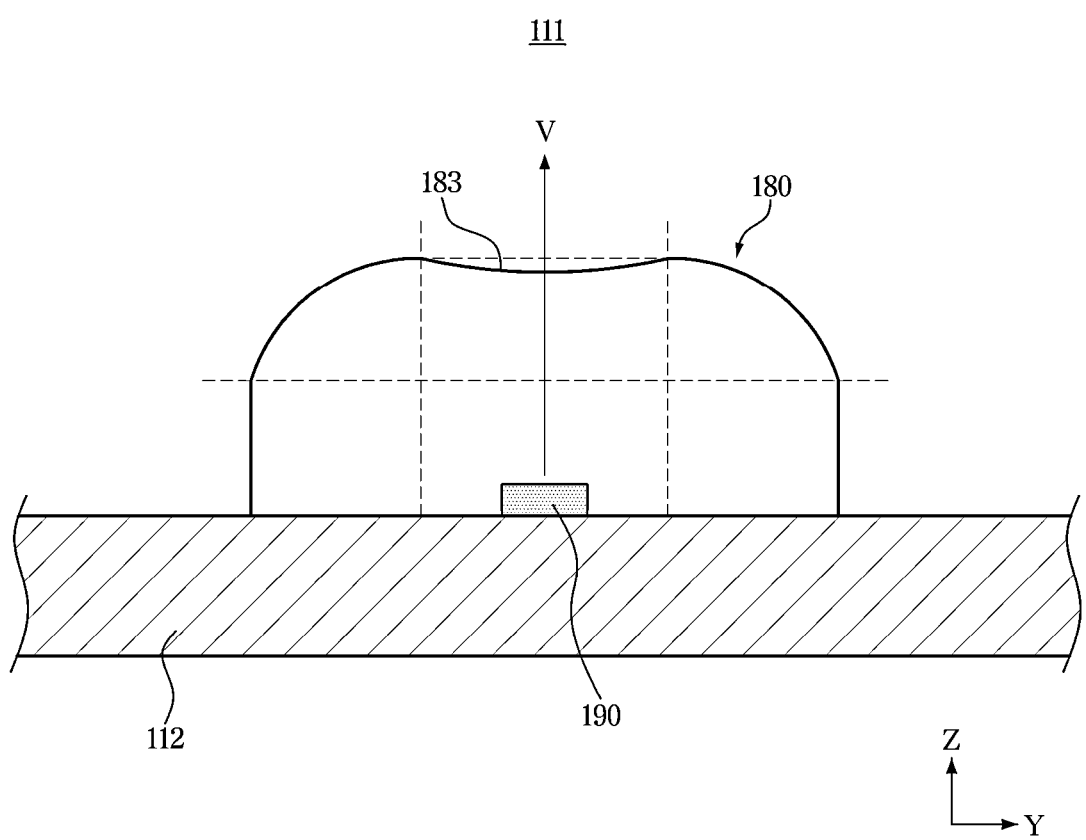
FIG. 15 is a diagram illustrating a case where a third refractive surface of a refractive cover according to an embodiment has a concave shape.
Figure 16:
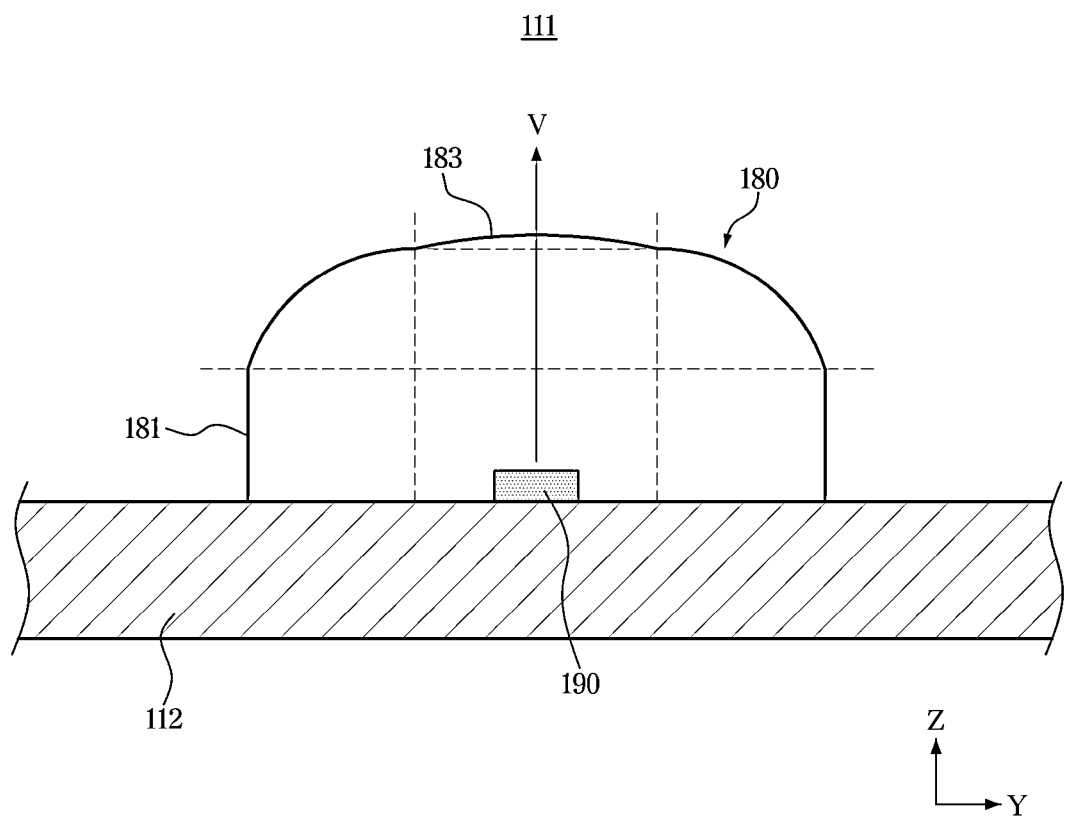
FIG. 16 is a diagram illustrating a case where a third refractive surface of a refractive cover according to an embodiment has a convex shape.

FIG. 15 is a diagram illustrating a case where the third refractive surface 183 of the refractive cover 180 according to an embodiment has a concave shape. FIG. 16 is a diagram illustrating a case where the third refractive surface 183 of the refractive cover 180 according to an embodiment has a convex shape.

Referring to FIG. 15, the third refractive surface 183 according to an embodiment may be provided in a concave shape. Specifically, a distance between the substrate 112 and a center of the third refractive surface 183 may be shorter than a distance between the substrate 112 and a periphery of the third refractive surface 183.

Based on the third refractive surface 183 being provided in a concave shape, an emission angle $\theta'_1$ of light passing through the third refractive surface 183 may be increased, resulting in a lower light intensity in a region perpendicular to the center of the LED 190. Accordingly, bright spots may be widened.

Referring to FIG. 16, the third refractive surface 183 according to an embodiment may be provided in a convex shape. Specifically, a distance between the substrate 112 and a center of the third refractive surface 183 may be greater than a distance between the substrate 112 and a periphery of the third refractive surface 183.

Based on the third refractive surface 183 being provided in a convex shape, an emission angle $\theta'_1$ of light passing through the third refractive surface 183 may be decreased, resulting in a higher light intensity in a region perpendicular to the center of the LED 190. Accordingly, dark spots may be removed.

Applying the refractive cover 180 surrounding the LED 190 to increase light diffusion and eliminate Mura effect has been described above in detail.

Hereinafter, embodiments of a method for manufacturing the display device 10 according to an aspect of the disclosure are described. The display device 10 according to the above-described embodiment may be manufactured based on the method for manufacturing the display device 10. Accordingly, the description that has been made with reference to FIG. 1 to FIG. 16 may be equally applicable to the method for manufacturing the display device 10.

Figure 17:
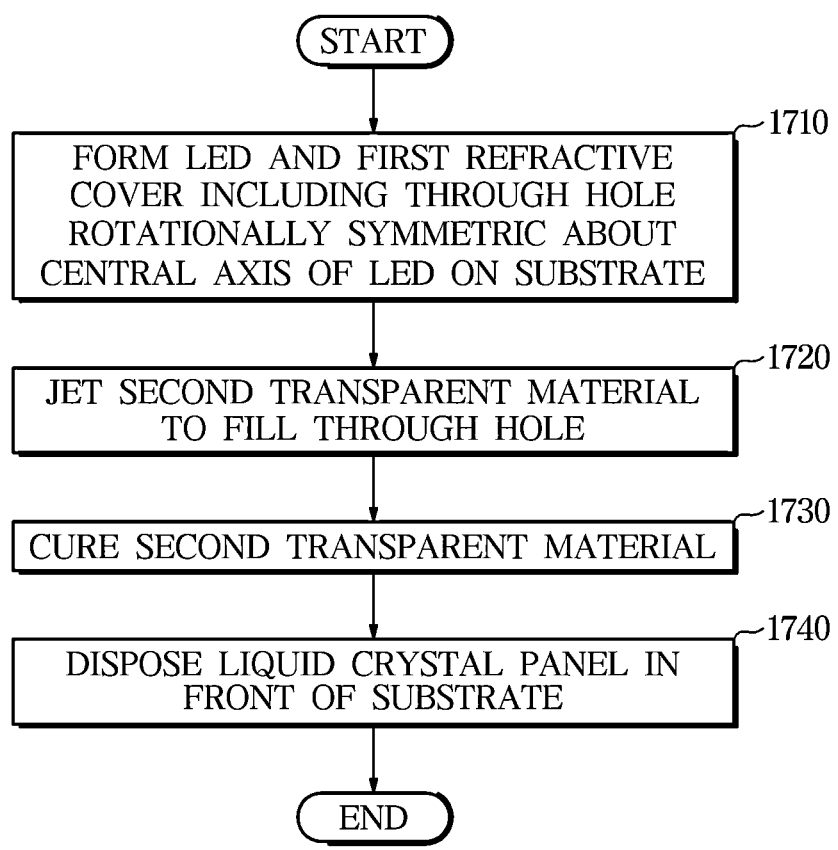
FIG. 17 is a flowchart illustrating a method for manufacturing a display device according to an embodiment.
Figure 18:
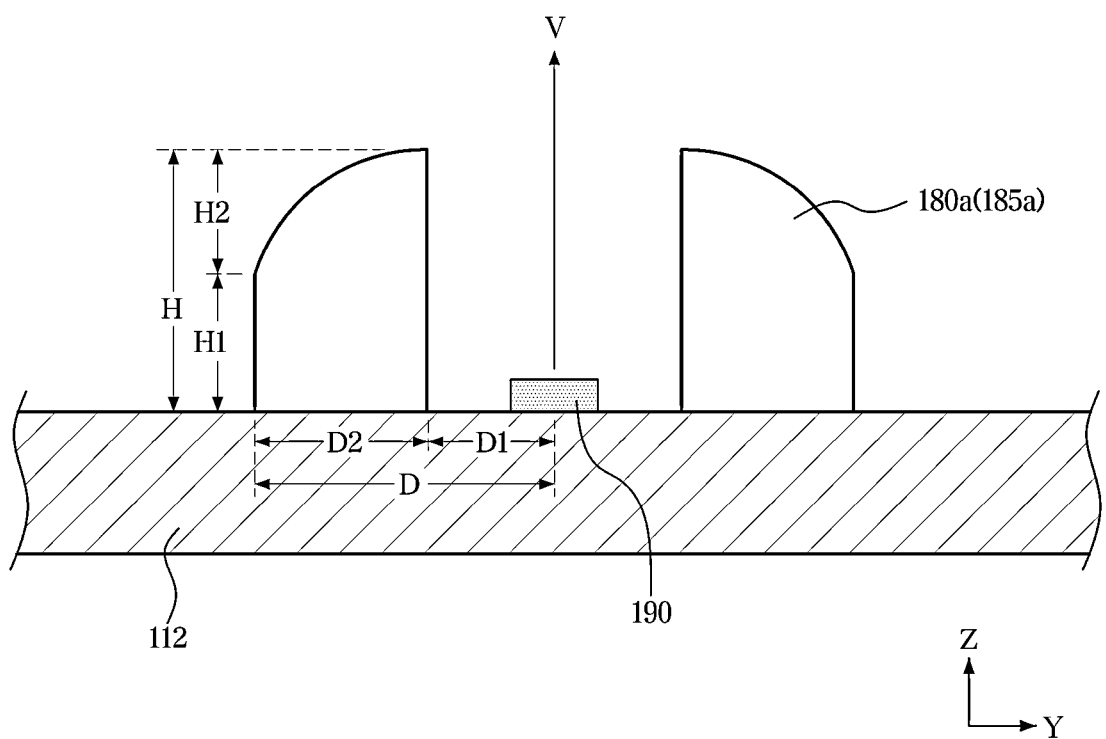
FIG. 18 is a diagram illustrating a case where a first refractive cover of a refractive cover according to an embodiment is formed.
Figure 19:
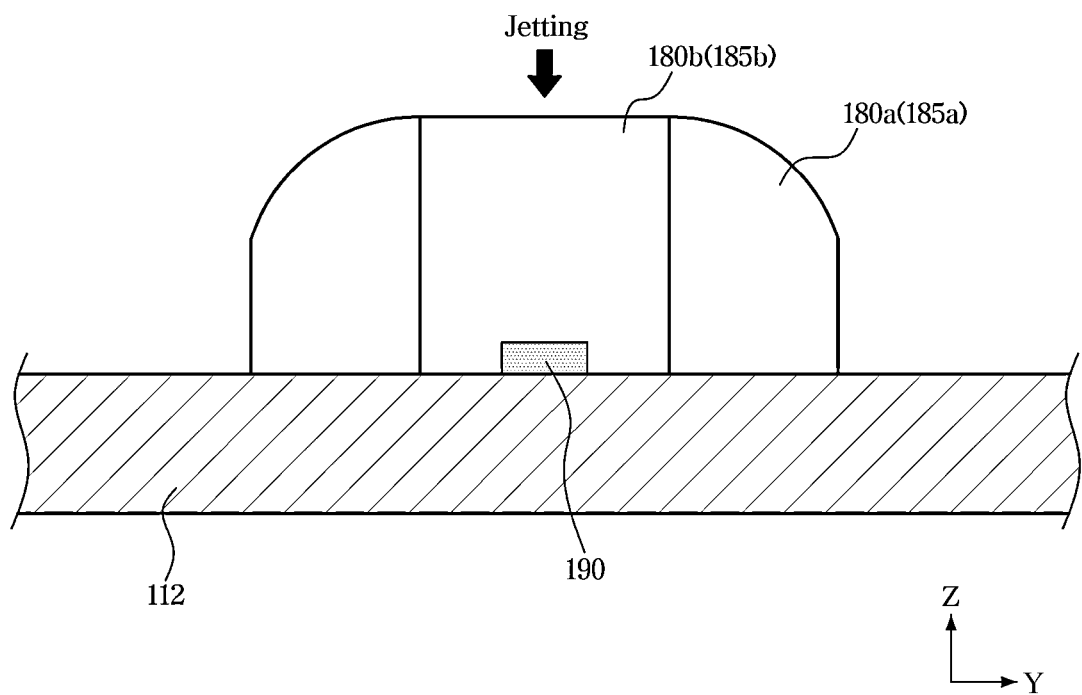
FIG. 19 is a diagram illustrating a case where a second refractive cover of a refractive cover according to an embodiment is formed.

FIG. 17 is a flowchart illustrating a method for manufacturing the display device 10 according to an embodiment. FIG. 18 is a diagram illustrating a case where a first refractive cover 180*a* of the refractive cover 180 according to an embodiment is formed. FIG. 19 is a diagram illustrating a case where a second refractive cover 180*b* of the refractive cover 180 according to an embodiment is formed.

Referring to FIG. 17, the LED 190 and the first refractive cover 180*a* including a through hole 188 that is rotationally symmetric or rotationally substantially symmetric about the central axis V of the LED 190 may be formed on the substrate 112 (1710).

That is, as shown in FIG. 18, the LED 190 may be formed on an upper surface of the substrate 112 according to an embodiment.

In addition, as shown in FIG. 18, the first refractive cover 180*a* including the through hole 188, which is filled with a first transparent material 185*a* and is rotationally symmetric or rotationally substantially symmetric about the central axis V of the LED 190, may be formed on the upper surface of the substrate 112 according to an embodiment.

According to embodiments, the first refractive cover 180*a* may be disposed on the upper surface of the substrate 112 after being formed via an injection molding process. That is, forming the LED 190 and the first refractive cover 180*a* on the upper surface of the substrate 112 may include forming the first refractive cover 180*a* via the injection molding process, forming the LED 190 on the upper surface of the substrate 112, and disposing the first refractive cover 180*a* on the upper surface of the substrate 112 such that the central axis of the LED 190 corresponds to a central axis of the first refractive cover 180*a*.

In addition, according to embodiments, the first refractive cover 180*a* may be formed directly on the upper surface of the substrate 112. That is, the first refractive cover 180*a* may be formed on the upper surface of the substrate 112 by jetting the first transparent material 185*a* on the upper surface of the substrate 112 and then curing the first transparent material 185*a*. That is, forming the LED 190 and the first refractive cover 180*a* on the upper surface of the substrate 112 may include forming the first refractive cover 180*a* on the upper surface of the substrate 112, and forming the LED 190 on the upper surface of the substrate 112 such that a central axis of the first refractive cover 180*a* corresponds to the central axis of the LED 190.

In this instance, the first refractive cover 180*a* may include the first refractive surface 181, which is positioned on the upper surface of the substrate 112, is spaced apart from the LED 190 by a preset distance D, is parallel to the central axis V of the LED 190 or inclined within a first angle from the central axis V of the LED 190, and the second refractive surface 182 which is a curved surface in which an angle between a tangent line and the central axis of the LED 190 increases from a region connected to an upper portion of the first refractive surface 181 toward a direction of the central axis of the LED 190. The second refractive surface 182 is also connected to an upper portion of the through hole 188.

In this case, the first refractive surface 181 and the second refractive surface 182 may be rotationally symmetric or rotationally substantially symmetric based on the central axis V of the LED 190.

The first refractive cover 180*a* may include the through hole 188 in a shape of a cylinder having a radius $D_{-1}$ and a height H, and the first transparent material 185*a* may fill between the through hole 188 and the refractive surfaces 181, 182.

That is, the first refractive cover 180*a* may correspond to a toroid obtained by rotating a rectangular shape and an upper curved surface which is provided on top of the rectangular shape, around the central axis V of the LED 190, wherein the rectangular shape has a width $D_2$ and a height $H_{1_-}$ and the upper curved surface has the width $D_2$ and a maximum height $H_{2_-}$.

Referring again to FIG. 17, a second transparent material 185*b* may be jetted (1720) to fill the through hole 188, and the second transparent material 185*b* may be cured (1730).

The through hole 188 according to an embodiment may be filled with the second transparent material 185*b*, as shown in FIG. 19. That is, the second transparent material 185*b* may be jetted into the through hole 188 through a nozzle, and may fill the through hole 188 to allow a horizontal surface to be formed at the height H of the through hole 188.

Thereafter, the second transparent material 185*b* may be cured via a curing process, and the cured second transparent material 185*b* may form the second refractive cover 180*b* including the third refractive surface 183 connected to an upper portion of the second refractive surface 182 and perpendicular to the central axis V of the LED 190.

In this instance, a curvature of the third refractive surface 183 may be adjusted depending on the jet amount of the second transparent material 185*b*. For example, in response to decreasing the jet amount of the second transparent material 185*b*, the third refractive surface 183 may be provided in a concave shape, and in response to increasing the jet amount of the second transparent material 185*b*, the third refractive surface 183 may be provided in a convex shape.

In addition, according to embodiments, the first transparent material 185*a* and the second transparent material 185*b* may have the same refractive index. According to embodiments, the second transparent material 185*b* may have a large refractive index, thereby minimizing interfacial reflections.

The refractive cover 180 including the first refractive cover 180*a* and the second refractive cover 180*b* may be formed through the above-described process.

Referring again to FIG. 17, after forming the refractive cover 180, the liquid crystal panel 20 may be disposed on the front of the substrate 112 (1740). Accordingly, the display device 10 may be manufactured.

As described above, according to the disclosure, productivity and price competitiveness may be improved through the process of jetting a liquid transparent material using a dispenser, instead of an expensive LED package including an aspherical optical lens shape.

Figure 20:
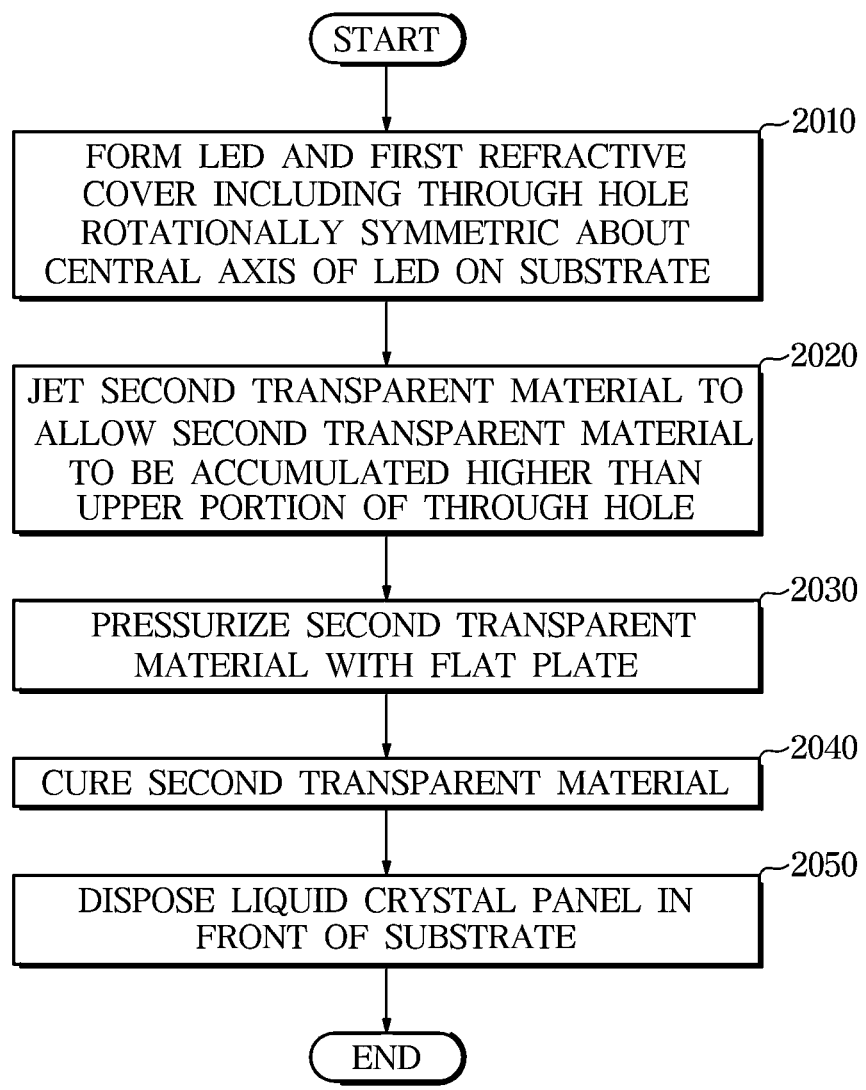
FIG. 20 is a flowchart illustrating a method for manufacturing a display device according to an embodiment.
Figure 21:
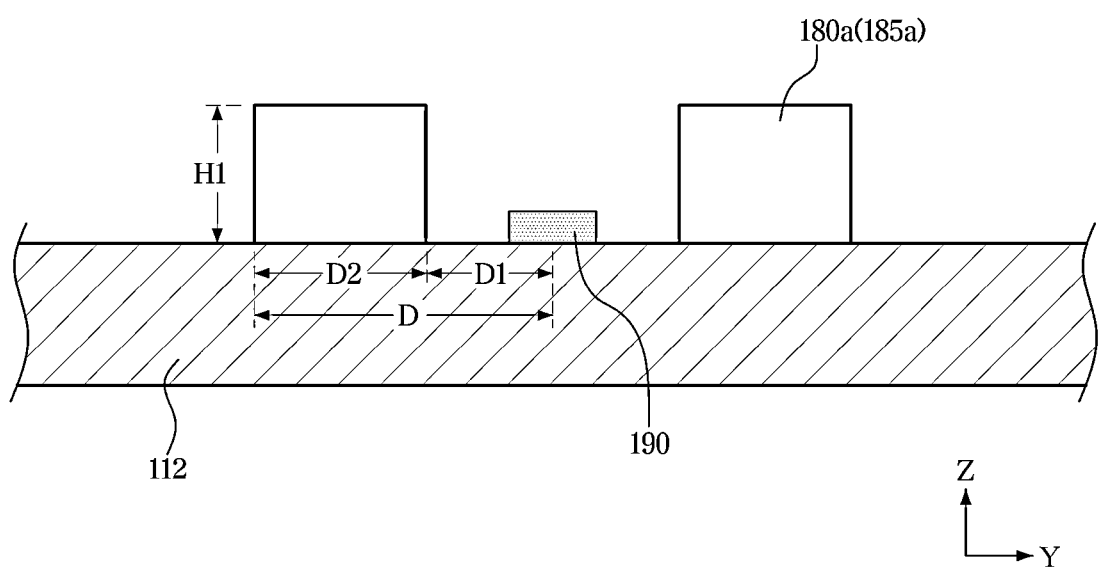
FIG. 21 and FIG. 22 are diagrams illustrating a case where a first refractive cover of a refractive cover according to an embodiment is formed.
Figure 22:
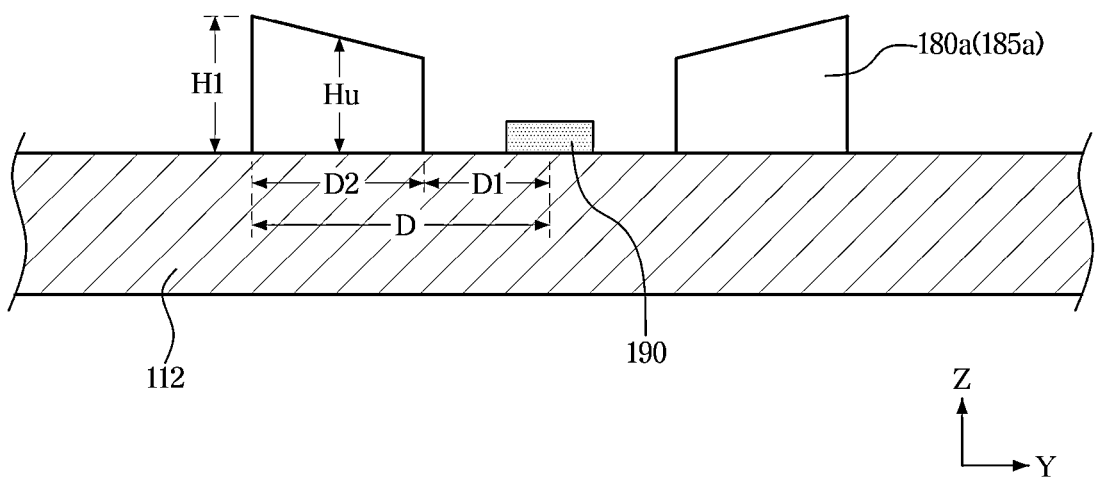
Figure 23:
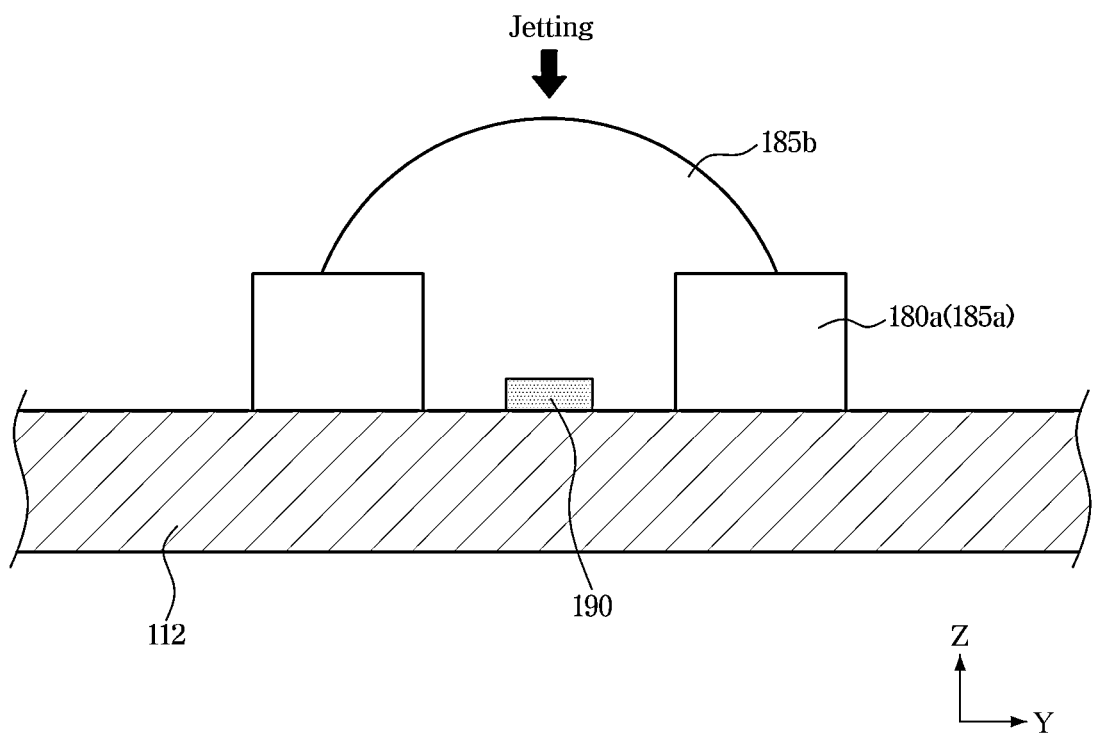
FIG. 23 is a diagram illustrating a case where a second refractive cover of a refractive cover according to an embodiment is formed.

FIG. 20 is a flowchart illustrating a method for manufacturing the display device 10 according to an embodiment. FIG. 21 and FIG. 22 are diagrams illustrating a case where the first refractive cover 180*a* of the refractive cover 180 according to an embodiment is formed. FIG. 23 and FIG. 24 are diagrams illustrating a case where the second refractive cover 180*b* of the refractive cover 180 according to an embodiment is formed.

Referring to FIG. 20, the LED 190 and the first refractive cover 180*a* including the through hole 188 rotationally symmetric or rotationally substantially symmetric about the central axis of the LED 190 may be formed on an upper surface of the substrate 112 (2010).

On the upper surface of the substrate 112 according to an embodiment, the LED 190 may be formed, as shown in FIG. 21.

In addition, as shown in FIG. 21, the first refractive cover 180a including the through hole 188, which is filled with the first transparent material 185a and is rotationally symmetric or rotationally substantially symmetric about the central axis V of the LED 190, may be formed on the upper surface of the substrate 112 according to an embodiment.

In this instance, the first refractive cover 180a may include the first refractive surface 181 spaced apart from the LED 190 by a preset distance D and parallel to the central axis V of the LED 190. The first refractive surface 181 may be rotationally symmetric or rotationally substantially symmetric about the central axis V of the LED 190.

According to embodiments, the first refractive cover 180a may be disposed on the upper surface of the substrate 112 after being formed via an injection molding process. That is, forming the LED 190 and the first refractive cover 180a on the upper surface of the substrate 112 may include forming the first refractive cover 180a via the injection molding process, forming the LED 190 on the upper surface of the substrate 112, and disposing the first refractive cover 180a on the upper surface of the substrate 112 such that a central axis of the first refractive cover 180a corresponds to the central axis of the LED 190.

In addition, according to embodiments, the first refractive cover 180a may be formed directly on the upper surface of the substrate 112. That is, the first refractive cover 180a may be formed on the upper surface of the substrate 112 by jetting the first transparent material 185a on the upper surface of the substrate 112 and then curing the first transparent material 185a. That is, forming the LED 190 and the first refractive cover 180a on the upper surface of the substrate 112 may include forming the first refractive cover 180a on the upper surface of the substrate 112 and forming the LED 190 on the upper surface of the substrate 112 such that the central axis of the first refractive cover 180a corresponds to the central axis of the LED 190.

The first refractive cover 180a may include the through hole 188 in a shape of a cylinder having a radius $D_{-1}$ and a height H, and the first transparent material 185a may fill between the through hole 188 and the refractive surfaces 181, 182.

That is, the first refractive cover 180a may correspond to a toroid obtained by rotating a rectangular shape with a width $D_2$ and a height $H_{1-}$ about the central axis V of the LED 190.

Furthermore, as shown in FIG. 22, an upper height $H_u$ of the first refractive cover 180a may be provided to decrease toward the central axis V of the LED 190 from a maximum height $H_1$. In this case, the first refractive cover 180a may correspond to a toroid obtained by rotating a trapezoidal shape with the width $D_2$ and the maximum height $H_1$ about the central axis V of the LED 190.

That is, the first refractive cover 180a may have the upper height $H_u$ which is maintained the same or increased, as a distance from the central axis V of the LED 190 increases.

The first refractive cover 180a of FIG. 21 is described below as an example. However, the following description is equally applicable to the first refractive cover 180a of FIG. 22.

Referring again to FIG. 20, the second transparent material 185b may be jetted to be accumulated higher than the upper portion of the first refractive cover 180a (2020), the second transparent material may be pressurized with a flat plate (2030), and the second transparent material may be cured (2040).

Referring to FIG. 23, the second transparent material 185b may be jetted into a center of the through hole 188 and may be accumulated higher than the upper portion of the first refractive cover 180a. That is, the second transparent material 185b may be jetted through a nozzle into the through hole 188 and may be accumulated higher than the maximum height $H_1$ of the first refractive cover 180a.

Referring to FIG. 24, the second transparent material 185b may be pressurized with a flat plate. Specifically, the second transparent material 185b may be pressurized from a position corresponding to the central axis of the LED 190, and the pressurized second transparent material 185b may form a dome shape with flat top.

Thereafter, the second transparent material 185b cured by a curing process may form the second refractive cover 180b including the second refractive surface 182, which is a curved surface in which an angle between a tangent line and the central axis V of the LED 190 increases from a region connected to the upper portion of the first refractive surface 181 toward a direction of the central axis V of the LED 190, and the third refractive surface 183 which is a plane connected to the upper portion of the second refractive surface 182 and perpendicular to the central axis V of the LED 190.

According to embodiments, the first transparent material 185a and the second transparent material 185b may have the same refractive index. According to embodiments, the second transparent material 185b may have a large refractive index, thereby minimizing interfacial reflections.

The refractive cover 180 including the first refractive cover 180a and the second refractive cover 180b may be formed through the above-described process.

Referring again to FIG. 20, after forming the refractive cover 180, the liquid crystal panel 20 may be disposed on the front of the substrate 112 (2050). Accordingly, the display device 10 may be manufactured.

As described above, productivity and price competitiveness may be improved through the process of jetting a liquid transparent material using a dispenser, instead of an expensive LED package including an aspherical optical lens shape.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored. For example, there may be a Read Only Memory (ROM), a Random Access Memory (RAM), a magnetic tape, a magnetic disk, a flash memory, and an optical data storage device.

Although the disclosure has been shown and described in relation to specific embodiments, it would be appreciated by those skilled in the art that changes and modifications may be made in these embodiments without departing from the principles and scope of the disclosure, the scope of which is defined in the claims and their equivalents.

What is claimed is:
1. A display device comprising:
a liquid crystal panel; and a backlight unit configured to provide light to the liquid crystal panel,
wherein the backlight unit comprises:
a substrate;
a Light Emitting Diode (LED) disposed on an upper surface of the substrate; and
a refractive cover configured to surround the LED,
wherein a lower surface of the refractive cover is in contact with an upper surface of the LED,
wherein the refractive cover comprises:
a first refractive surface configured to:
be spaced apart from the LED by a preset distance,
be positioned on the upper surface of the substrate,
be parallel to a central axis of the LED or be inclined within a first angle from the central axis of the LED;
a second refractive surface configured to be a curved surface in which a second angle between a tangent line and the central axis of the LED increases from a region connected to an upper portion of the first refractive surface toward a direction of the central axis of the LED; and
a third refractive surface configured to be connected to an upper portion of the second refractive surface and be perpendicular to the central axis of the LED.

2. The display device of claim 1, wherein the LED comprises:
a light emitting layer; and
a Distributed Bragg Reflector (DBR) configured to be disposed on the light emitting layer, and
wherein an intensity of light emitted from the LED is maximum in a direction inclined at the second angle from the central axis of the LED.

3. The display device of claim 2, wherein the second refractive surface includes a first region through which light with a maximum light intensity, among the light emitted from the LED, passes.

4. The display device of claim 3, wherein the first refractive surface includes a second region through which light with a half of the maximum light intensity, among the light emitted from the LED, passes, the light being inclined at an angle greater than the second angle from the central axis of the LED.

5. The display device of claim 3, wherein the third refractive surface includes a third region through which light with a half of the maximum light intensity, among the light emitted from the LED, passes, the light being inclined at an angle smaller than the second angle from the central axis of the LED.

6. The display device of claim 1, wherein the third refractive surface is configured to be a plane.

7. The display device of claim 1, wherein the third refractive surface is configured to have a concave shape.

8. The display device of claim 1, wherein the third refractive surface is configured to have a convex shape.

9. The display device of claim 1, wherein the refractive cover is configured to include a transparent material with a refractive index greater than that of air.

10. The display device of claim 1, wherein the refractive cover is configured to be rotationally symmetric or rotationally substantially symmetric about the central axis of the LED.

11. The display device of claim 1, wherein the LED is configured to be provided as an array of a plurality of LEDs on the upper surface of the substrate, and wherein the refractive cover is configured to be provided as a plurality of refractive covers to correspond respectively to the plurality of LEDs.

12. A method for manufacturing a display device, the method comprising:
forming a Light Emitting Diode (LED) and a first refractive cover on an upper surface of a substrate, the first refractive cover including a through hole configured to be filled with a first transparent material and be rotationally symmetric or rotationally substantially symmetric about a central axis of the LED;
jetting a second transparent material to fill the through hole;
curing the second transparent material;
disposing a liquid crystal panel in front of the substrate,
wherein the first refractive cover comprises:
a first refractive surface configured to:
be spaced apart from the LED by a preset distance,
be positioned on the upper surface of the substrate, and
be parallel to the central axis of the LED or be inclined within a first angle from the central axis of the LED; and
a second refractive surface configured to be a curved surface in which a second angle between a tangent line and the central axis of the LED increases from a region connected to an upper portion of the first refractive surface toward a direction of the central axis of the LED, and configured to be connected to an upper portion of the through hole.

13. The method of claim 12, wherein the cured second transparent material is configured to form a second refractive cover including a third refractive surface, and
wherein the third refractive surface is connected to an upper portion of the second refractive surface and is perpendicular to the central axis of the LED.

14. The method of claim 13, further comprising adjusting a jet amount of the second transparent material to adjust a curvature of the third refractive surface.

15. A method for manufacturing a display device, the method comprising:
forming a Light Emitting Diode (LED) and a first refractive cover including a first refractive surface and a through hole on an upper surface of a substrate, the first refractive surface being configured to be filled with a first transparent material, be spaced apart from the LED by a predetermined distance, and be parallel to a central axis of the LED, and the through hole being configured to be rotationally symmetric or rotationally substantially symmetric about the central axis of the LED;
jetting a second transparent material to a center of the through hole, to allow the second transparent material to be accumulated higher than an upper portion of the first refractive cover;
pressurizing the second transparent material from a position corresponding to the central axis of the LED using a flat plane;
curing the pressurized second transparent material; and
disposing a liquid crystal panel in front of the substrate,
wherein the cured second transparent material is configured to form a second refractive cover including a second refractive surface and a third refractive surface,
wherein the second refractive surface is configured to be a curved surface in which a second angle between a tangent line and the central axis of the LED increases from a region connected to an upper portion of the first refractive surface toward a direction of the central axis of the LED, and wherein the third refractive surface is configured to be a plane connected to an upper portion of the second refractive surface and perpendicular to the central axis of the LED.

16. The display device of claim 1, wherein a light output by the LED is refracted only once before the light is output through one of the first, the second, and the third refractive surfaces.

* * * * *